(12) United States Patent
Ozawa et al.

(10) Patent No.: US 7,284,206 B2
(45) Date of Patent: Oct. 16, 2007

(54) IMAGE PROCESSING APPARATUS, ITS CONTROL METHOD, AND STORAGE MEDIUM

(75) Inventors: Mamoru Ozawa, Kanagawa (JP); Yoshiyuki Endo, Kanagawa (JP); Shinichi Matsumoto, Kanagawa (JP); Kiyoshi Iwabuchi, Tokyo (JP); Hideki Narushima, Kanagawa (JP); Masato Hasegawa, Tokyo (JP); Tatsuya Hisatomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 09/861,521

(22) Filed: May 22, 2001

(65) Prior Publication Data

US 2002/0054056 A1    May 9, 2002

(30) Foreign Application Priority Data

May 24, 2000    (JP) .............................. 2000-153618

(51) Int. Cl.
*G06F 3/048*    (2006.01)
(52) U.S. Cl. ....................... 715/822; 715/764; 715/827; 715/821; 715/823; 715/824; 715/825; 715/826
(58) Field of Classification Search ................ 345/115, 345/427, 418, 822, 827, 764, 821, 823, 824, 345/825, 826
See application file for complete search history.

(56) References Cited

U.S. PATENT DOCUMENTS 5,708,787 A * 1/1998 Nakano et al. ............. 345/841
5,803,914 A * 9/1998 Ryals et al. ................. 600/407
6,025,843 A * 2/2000 Sklar .......................... 715/841
6,041,281 A * 3/2000 Nimura et al. .............. 701/211
6,269,171 B1 * 7/2001 Gozzo et al. ................ 382/101
6,424,738 B1 * 7/2002 Katsumura et al. ......... 382/165
6,463,426 B1 * 10/2002 Lipson et al. .................. 707/3
6,654,027 B1 * 11/2003 Hernandez ................... 345/619
6,661,438 B1 * 12/2003 Shiraishi et al. ............. 345/835

* cited by examiner

*Primary Examiner*—Kristine Kincaid
*Assistant Examiner*—Peng Ke
(74) *Attorney, Agent, or Firm*—Fitzpatrick, Cella, Harper & Scinto

(57) ABSTRACT

An object of this invention is to process image data in which a plurality of link destinations are set in one region. Another object of this invention is to allow the user intuitively to recognize the setup states of links, since link regions have different display patterns in correspondence with the numbers of link destinations upon displaying the link regions. If the designated link region has only one link destination, a dotted circle (for example) is displayed on the link region (S407). If the designated link region has two link destinations, a solid circle (for example) is displayed (step S409). If the designated link region has three or more link destinations, a double circle (for example) is displayed (step S408). Again, if the designated link region has only one link destination, an image at the link destination is set as display data (S421), while if the designated link region has a plurality of link destinations, all the link destinations may be displayed in a list (S415). An image at a link destination selected by the operator from the list is set as display data (S419).

11 Claims, 24 Drawing Sheets

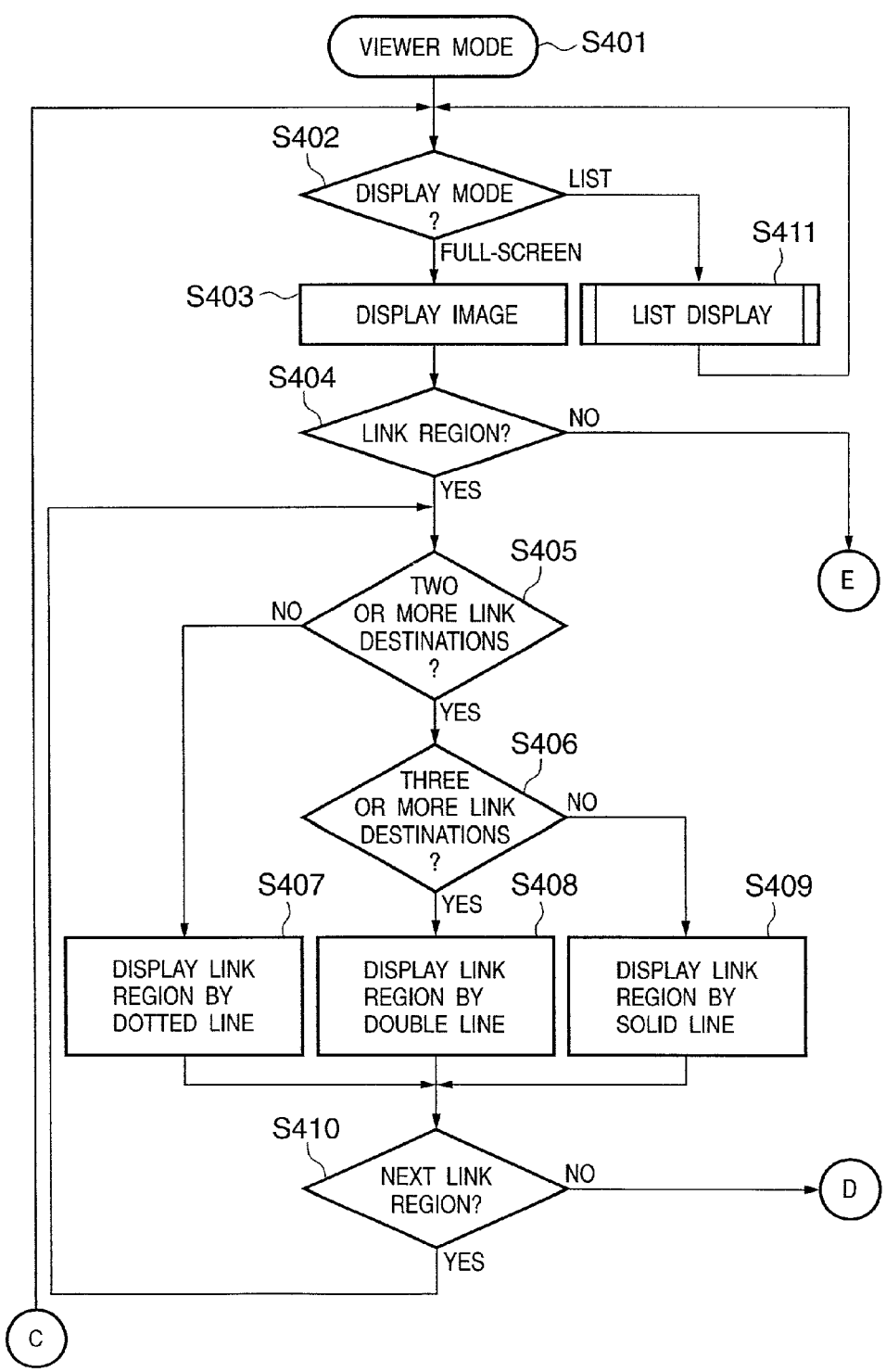

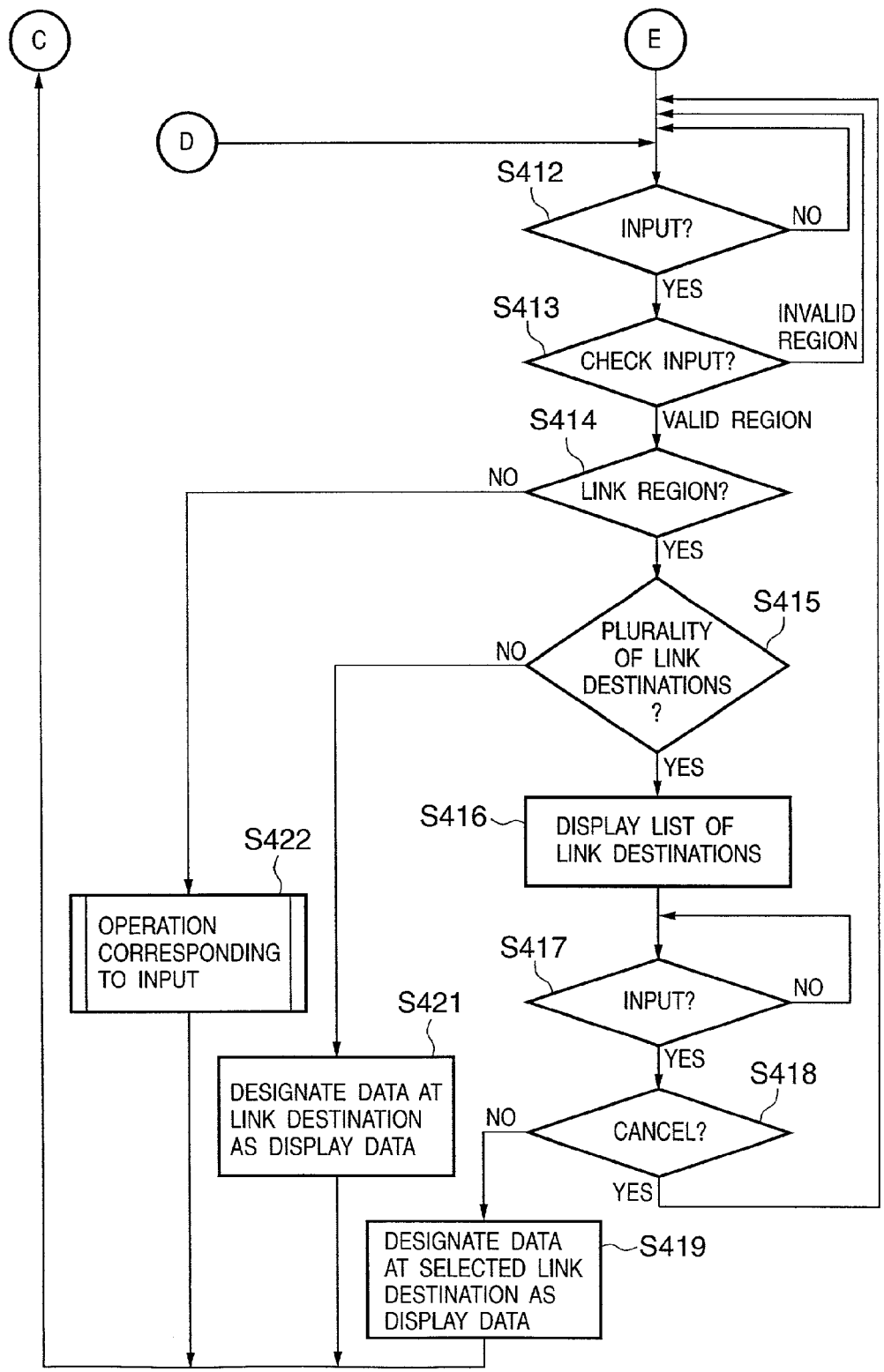

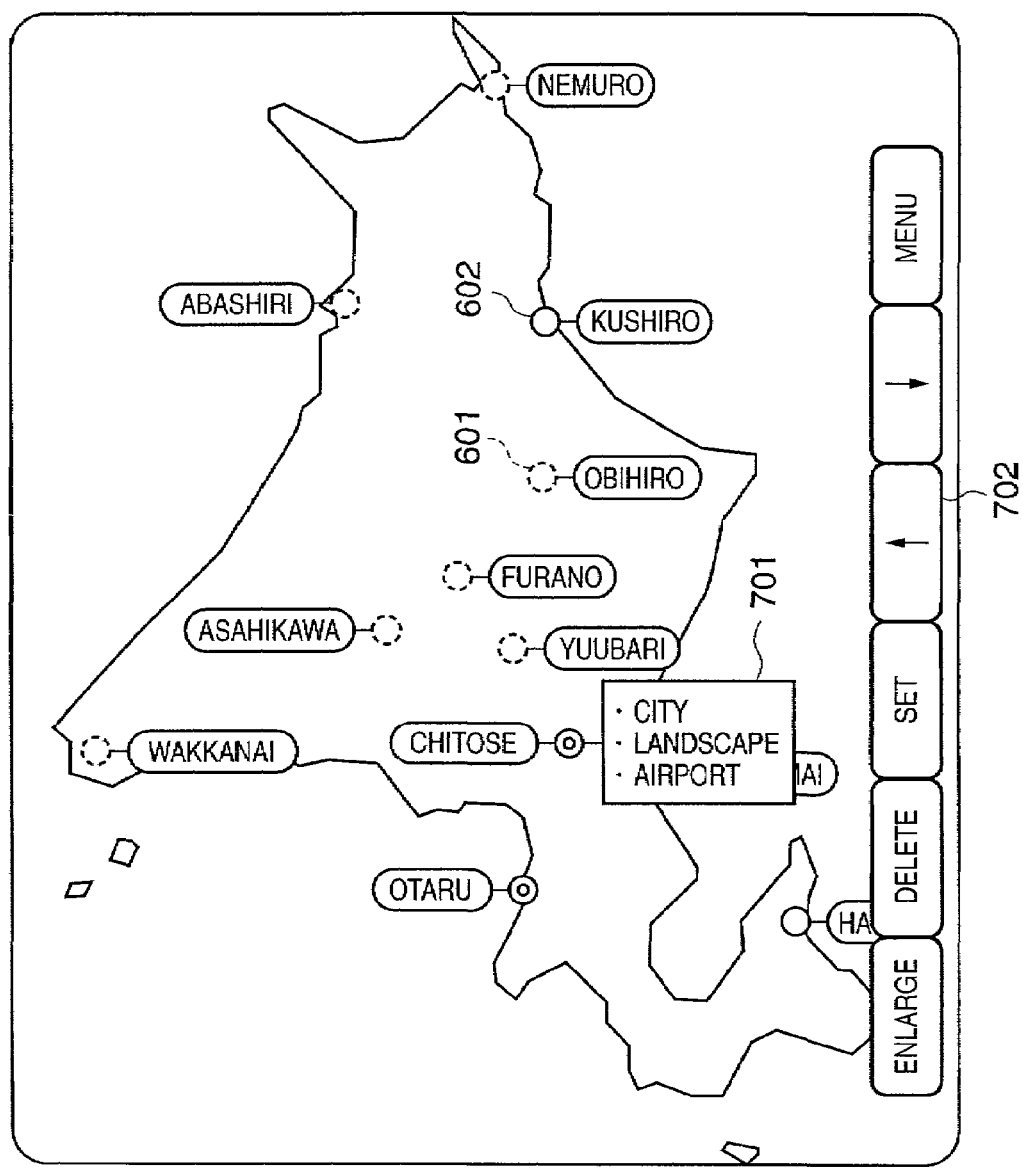

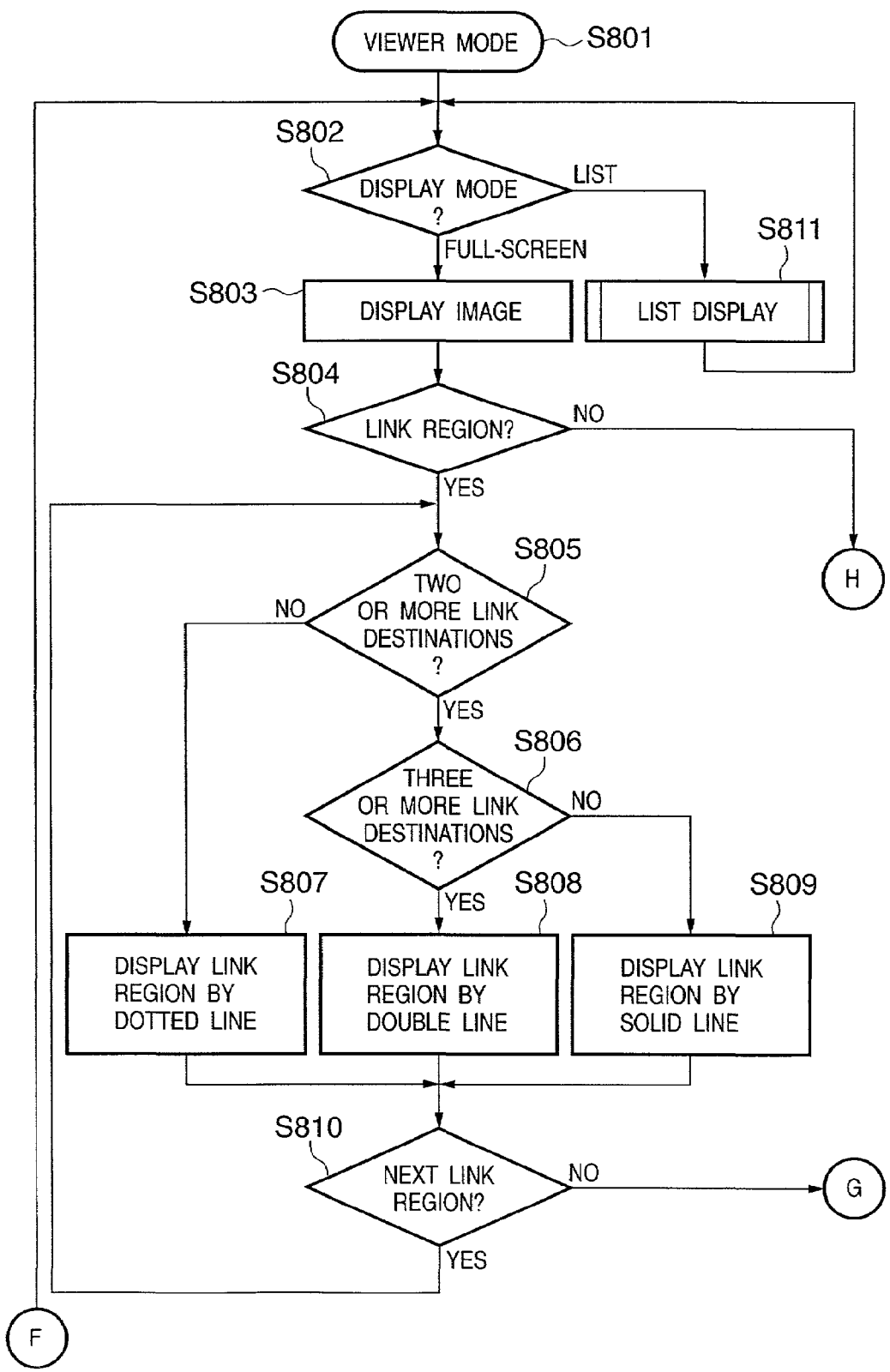

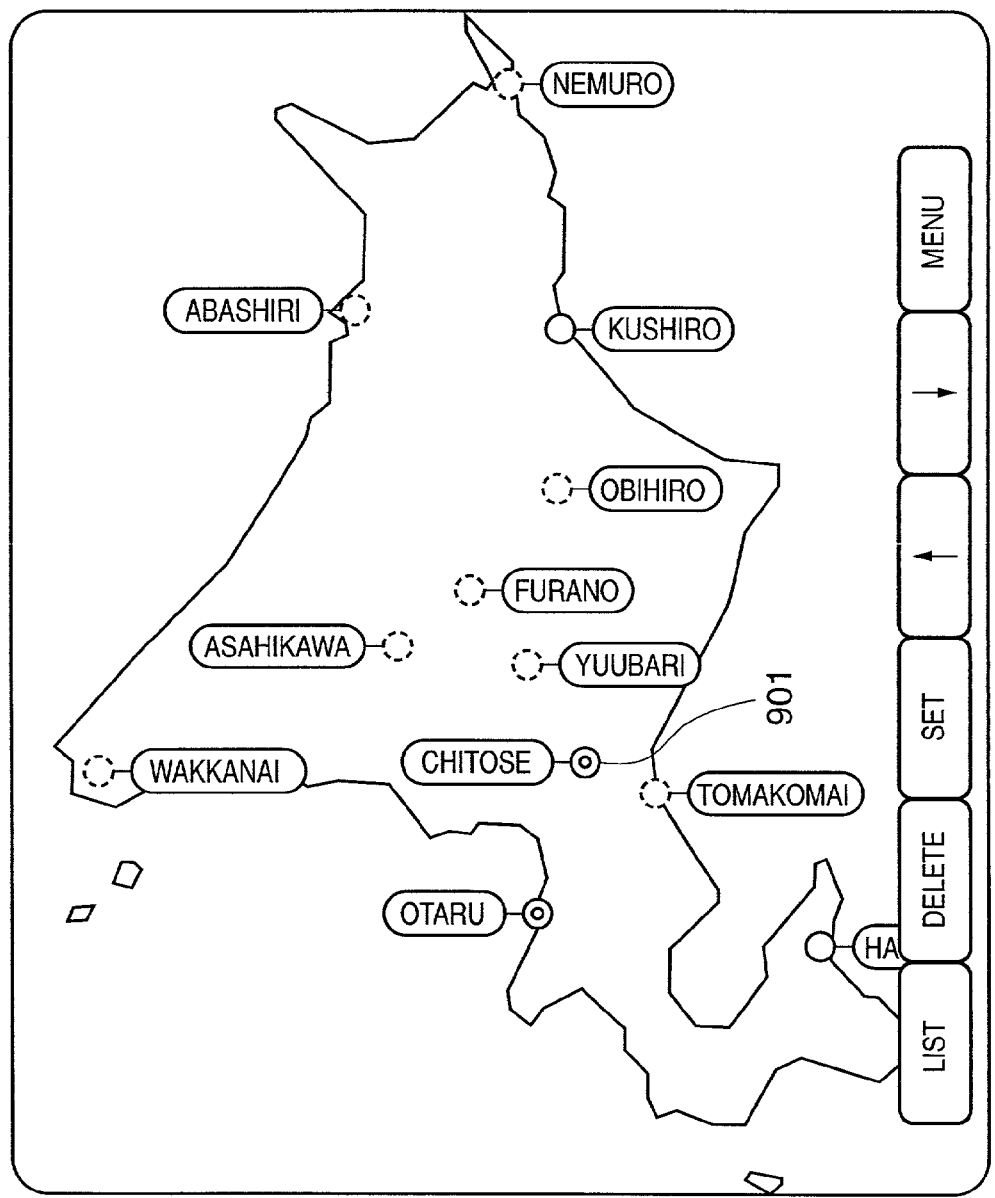

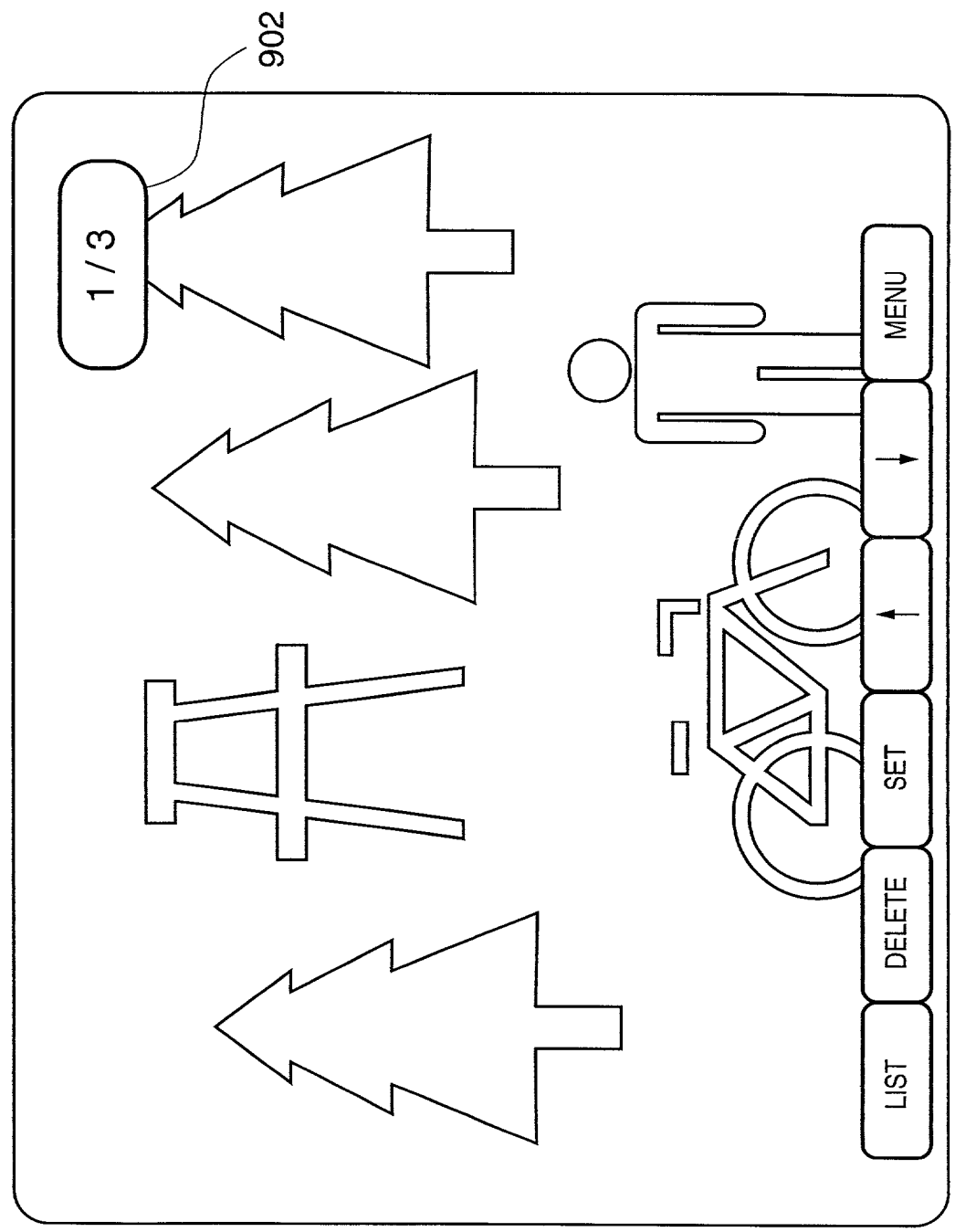

| I | II | III |
|---|---|---|
| CHITOSE | CHITOSE | CHITOSE |
| ↓ | ↓ | ↓ |
| OTARU | OTARU | HAKODATE |
| ↓ | ↓ | ↓ |
| HAKODATE | ASAHIKAWA | CHITOSE |
| ↓ | ↓ | |
| TOMAKOMAI | ABASHIRI | |
| ↓ | ↓ | |
| YUUBARI | KUSIRO | |
| ↓ | ↓ | |
| CHITOSE | CHITOSE | |

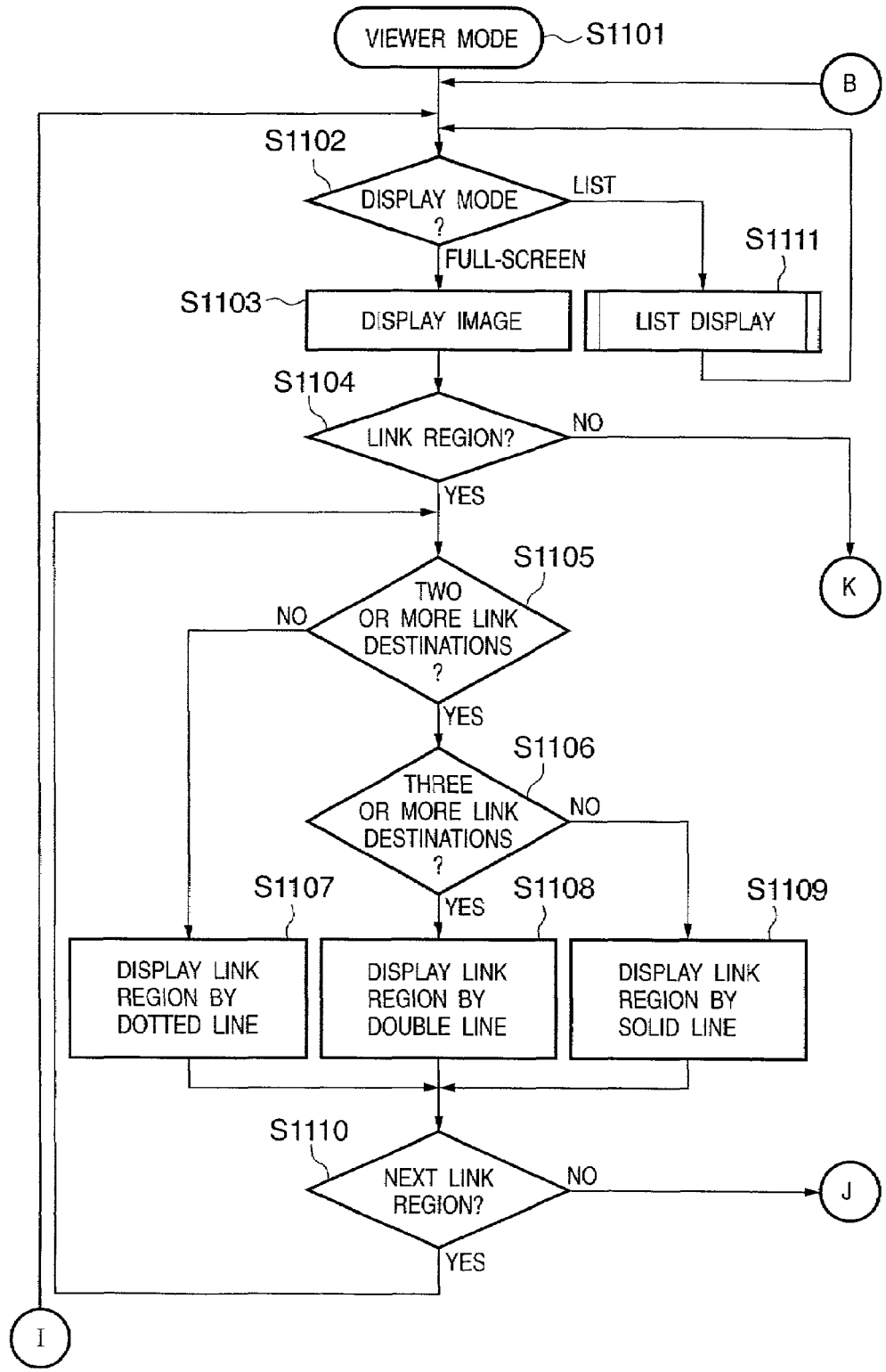

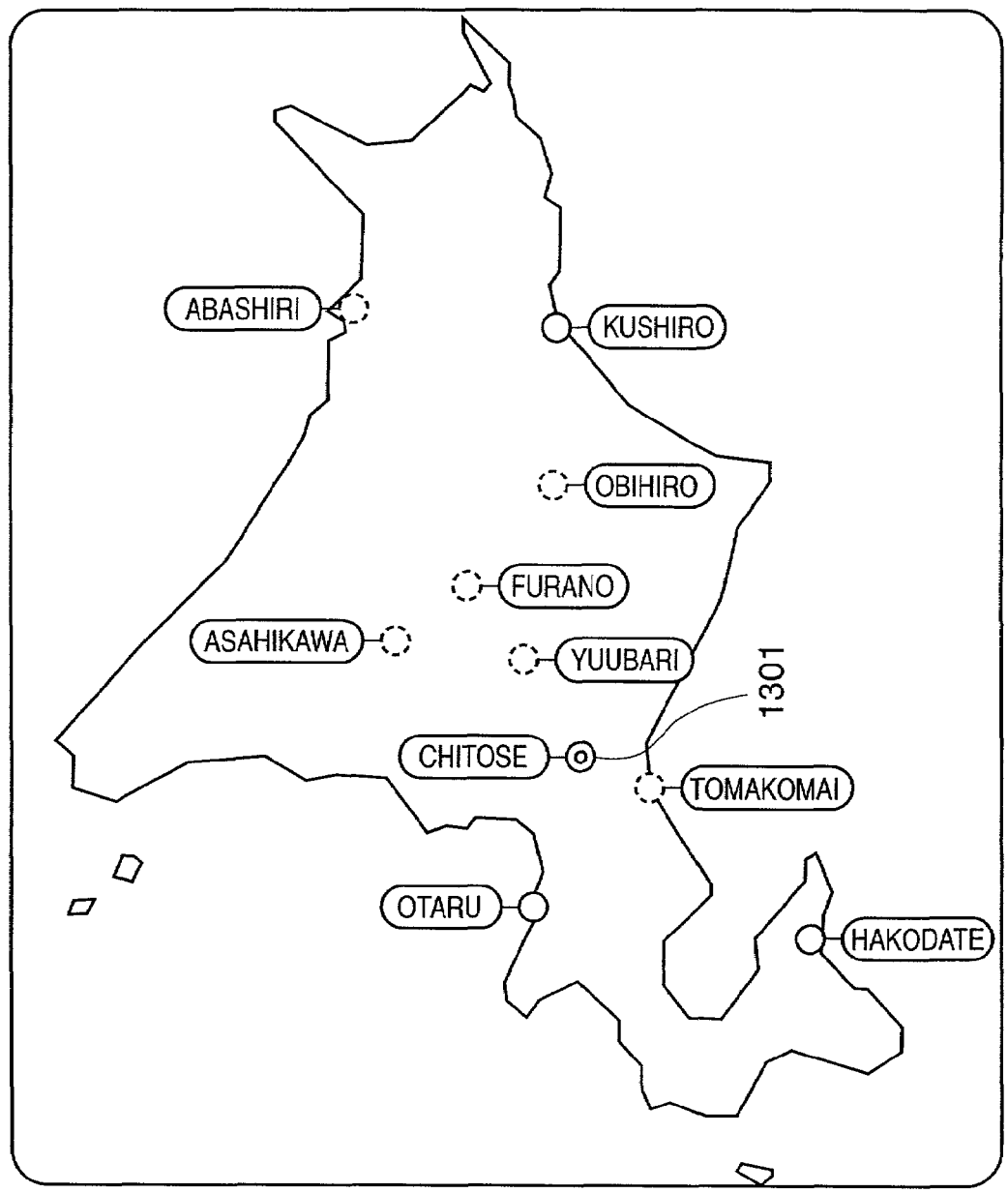

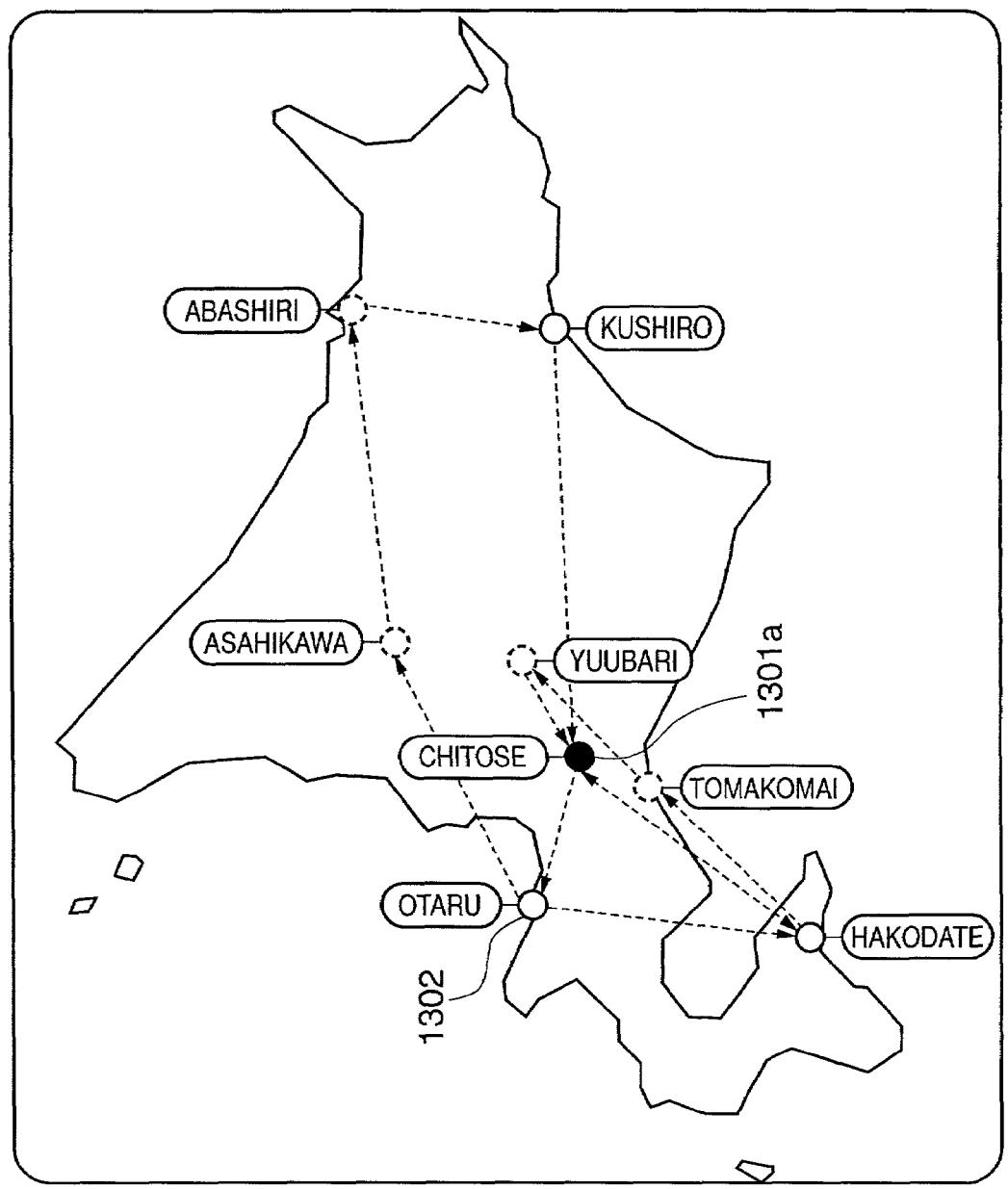

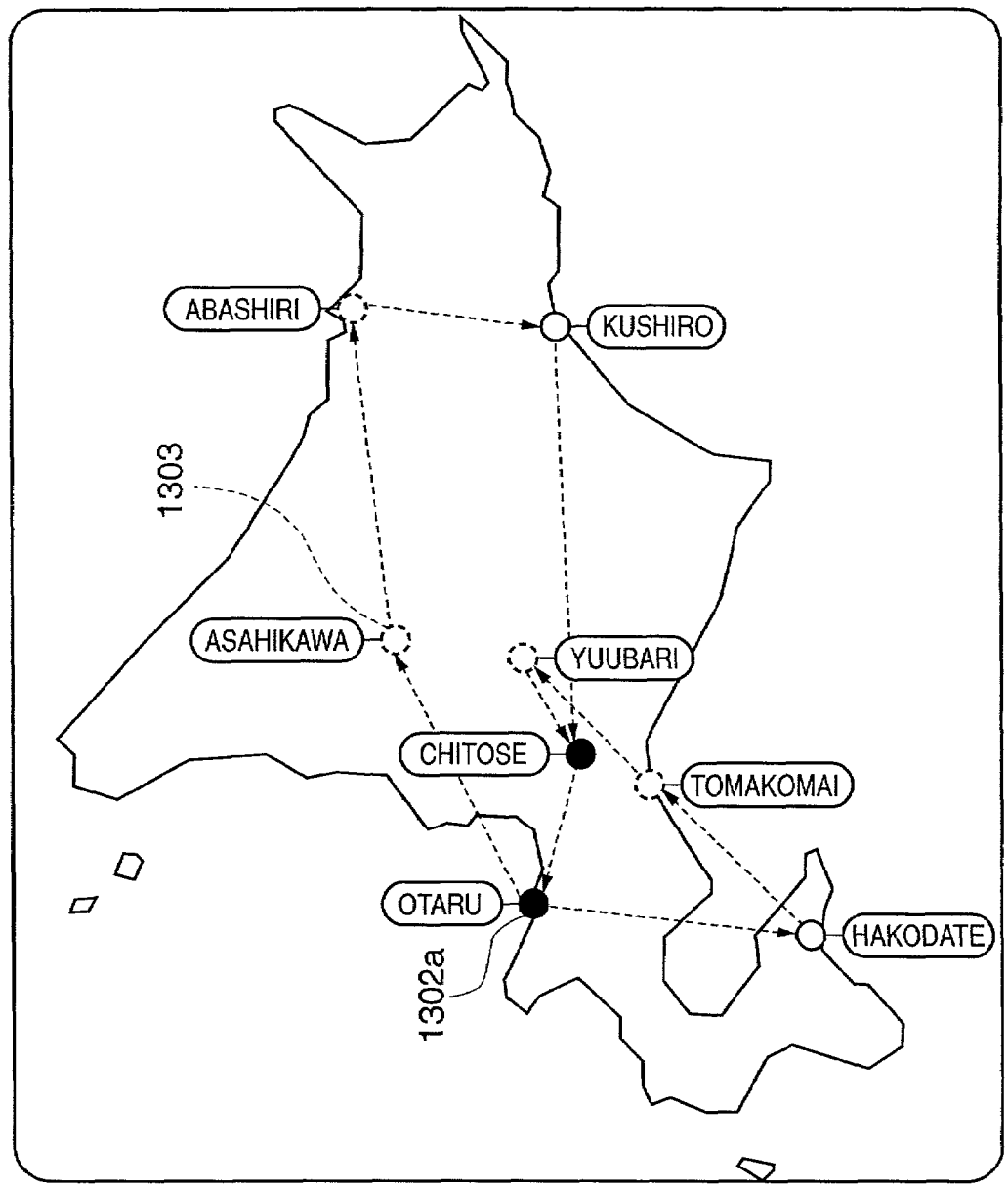

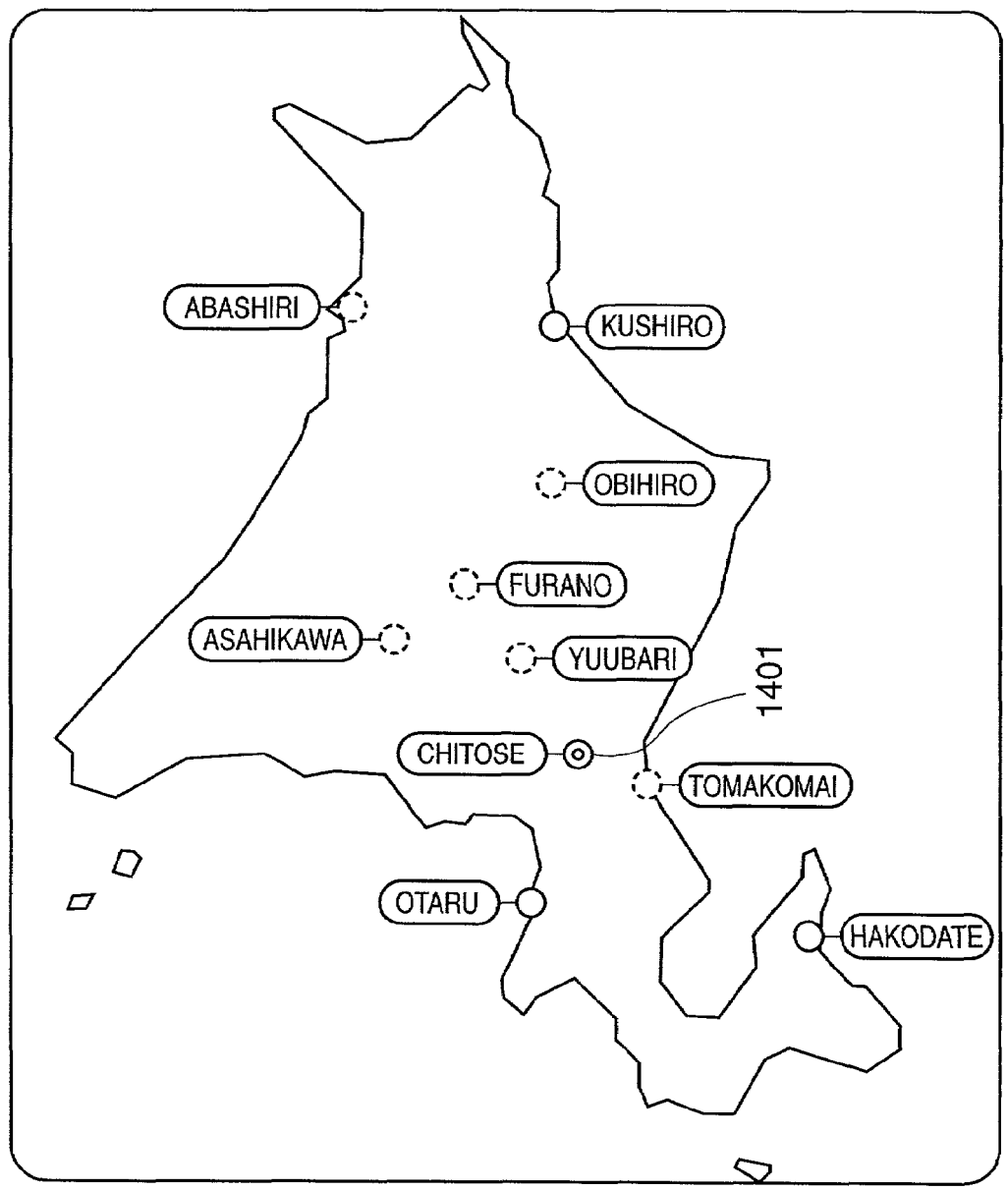

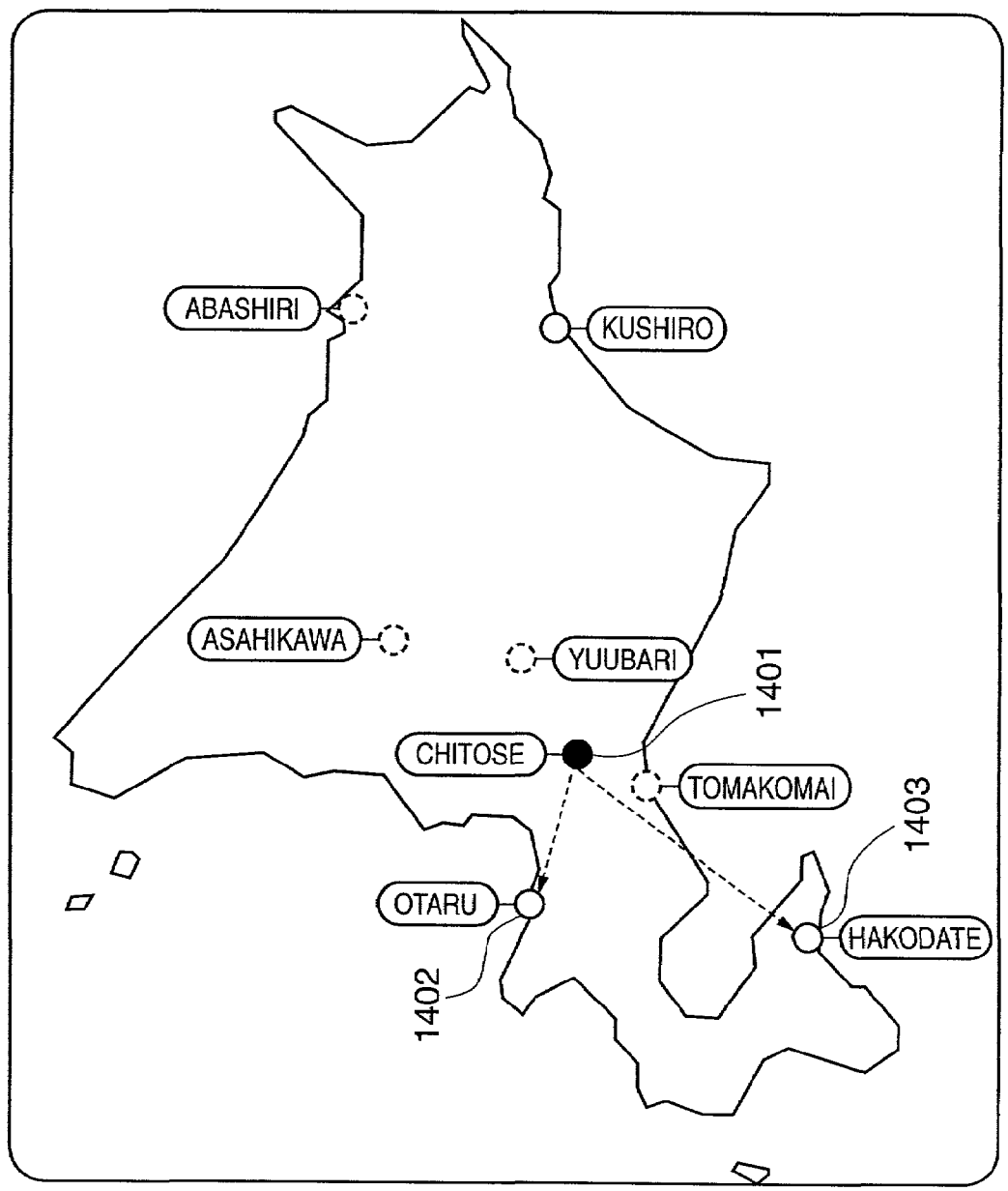

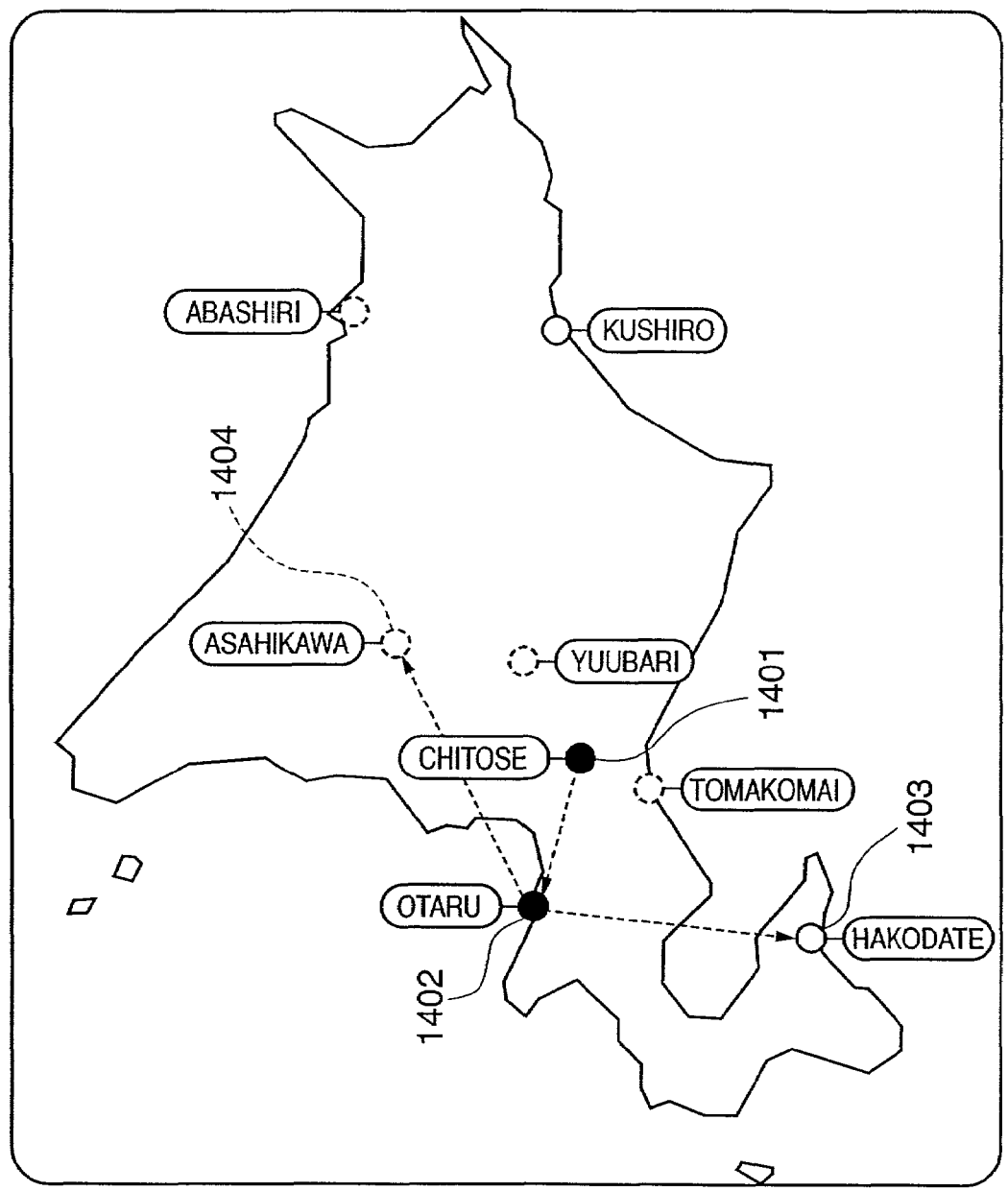

FIG. 15

| | | | | | | | |
|---|---|---|---|---|---|---|---|
| 1 | IMAGE NO. | XXXXXXXX | | | | | |
| 2 | IMAGE SENSING TIME | 14 : 13 : 30, MAY 07, 1999 | | | | | |
| 3 | LINK INFORMATION | GROUP NO. | | ORDER IN LINK | | | |
| | | PREVIOUS IMAGE NO. | | NEXT IMAGE NO. | | | |
| 4 | LINK REGION INFORMATION | LINK REGION 1 | DISPLAY COORDINATE OF LINK REGION | NUMBER OF LINK IMAGES | IMAGE NO. | ------ | IMAGE NO. |
| | | LINK REGION 2 | DISPLAY COORDINATE OF LINK REGION | NUMBER OF LINK IMAGES | IMAGE NO. | ------ | IMAGE NO. |
| | | ------ | ------ | ------ | ------ | ------ | ------ |
| | | LINK REGION n | DISPLAY COORDINATE OF LINK REGION | NUMBER OF LINK IMAGES | IMAGE NO. | ------ | IMAGE NO. |

IMAGE PROCESSING APPARATUS, ITS CONTROL METHOD, AND STORAGE MEDIUM

FIELD OF THE INVENTION

The present invention relates to an image processing apparatus for selecting one of a plurality of regions included in first image data, detecting various select instructions of the selected region, and displaying second image data which is set in advance in correspondence with the detected region. The invention relates also to a control method for such apparatus, and to a storage medium.

BACKGROUND OF THE INVENTION

Conventionally, only one piece of data can be associated with one link region.

In the prior art, only one piece of link information can be set for one link region. Hence, to set an image sensed at a given location as a link in, e.g., a map, since only one image can be set, another link region must be near the region where the link is to be set.

The present invention has been made in consideration of the above problem, and has as its object to process image data in which a plurality of image data are set in one region. It is another object of the present invention to allow the user to intuitively recognize the set-up state of image data for each region.

SUMMARY OF THE INVENTION

To achieve the objects of the present invention, an image processing apparatus of the present invention comprises the following arrangement.

That is, the image processing apparatus comprises detection means for detecting one region designated by the user from a plurality of regions which are included in an image, list display means for, when a plurality of pieces of information are associated with the detected region, displaying a list used to select one of the plurality of pieces of information, and information display means for displaying information associated with the region, which is selected from the list displayed by the list display means.

Furthermore, the plurality of regions contained in the image have different display patterns in correspondence with numbers of pieces of information associated with the region.

Moreover, when the plurality of regions contained in the image belong to some ordered groups, the list display means displays the groups to which the designated region belong, and when the user designates another region contained in the image, the group to be displayed is selected.

Other features and advantages of the present invention will be apparent from the following description taken in conjunction with the accompanying drawings, in which like reference characters designate the same or similar parts throughout the figures

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are flow charts showing the operation of an application of a viewer mode of the image processing apparatus in the first embodiment of the present invention;

FIG. 7 shows an image display example in the first embodiment;

FIGS. 8A and 8B are flow charts showing the operation of an application in a viewer mode of an image processing apparatus according to the second embodiment of the present invention;

FIG. 9A shows an image display example in the second embodiment;

FIG. 9B shows an image display example in the second embodiment;

FIGS. 11A and 11B are flow charts of a process of an image processing apparatus in the third embodiment;

FIG. 13A shows a screen display example in the third embodiment;

FIG. 13B shows a screen display example in the third embodiment;

FIG. 13C shows a screen display example in the third embodiment;

FIG. 14A shows a screen display example in the third embodiment;

FIG. 14B shows a screen display example in the third embodiment;

FIG. 14C shows a screen display example in the third embodiment; and

FIG. 15 shows the configuration of link information in additional information of image data.

DETAILED DESCRIPTION OF THE PREFERRED EMBODIMENTS

The preferred embodiments of the present invention will now be described in detail in accordance with the accompanying drawings.

[First Embodiment]

Figure 1:
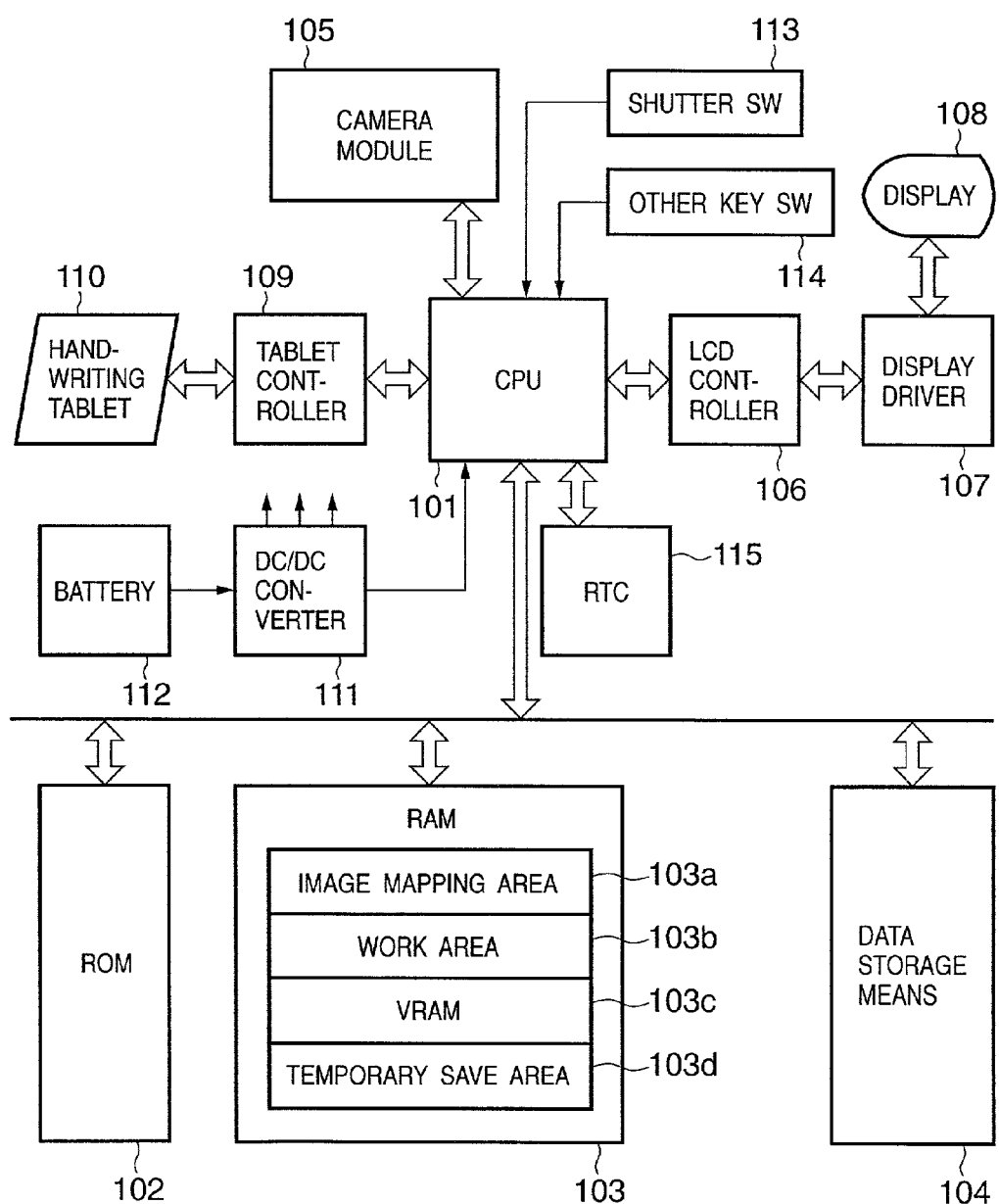
FIG. 1 is a schematic block diagram showing the arrangement of an image processing apparatus according to the first embodiment of the present invention.

FIG. 1 is a schematic block diagram showing the arrangement of an image processing apparatus in this embodiment. Referring to FIG. 1, reference numeral 101 denotes a CPU which controls the operation of the image processing apparatus of this embodiment. To the CPU 101 are connected a ROM 102 that stores various control programs, a RAM 103, a data storage means 104 for storing user data, a camera module 105, a table controller 109 for controlling and detecting a tablet, an LCD controller 106, an RTC (real-time clock) 115, a shutter switch SW, and a key SW group 114 used in other operations. A display driver 107 and display (e.g., a TFT color liquid crystal display or the like) 108 are connected to the LCD controller 106. A handwriting tablet 110 set on the display 108 is connected to the tablet controller 109, which detects inputs to the handwriting tablet 110.

The CPU 101 executes various control processes on the basis of various control programs in the ROM 102. These control processes include a process for reading a sensed image signal output from the camera module 105 and DMA-transferring the signal to the RAM 103, a process for DMA-transferring data from the RAM 103 to the LCD controller 106, a process for compressing image data by JPEG, and storing the compressed data in the data storage means 104 in a file format, execution of various applications according to information input from the handwriting tablet 110, an image sensing instruction upon operation of the shutter SW 113, and the like.

The ROM 102 stores codes which represent characters, symbols, and the like to be displayed on the display 108 in addition to the control programs.

The RAM 103 comprises an image mapping area 103a, a work area 103b of, e.g., an application or the like, a VRAM 103c, a temporary save area 103d, and the like. The image mapping area 103a is used as a temporary buffer for temporarily storing a sensed image (YUV digital signal) sent from the camera module 105 or JPEG-compressed image data read out from the data storage means 104, and an image-dedicated work area for image compression and decompression processes. The work area 103b is used when the CPU 101 executes various control programs. The VRAM 103c stores display data to be displayed on the display 108. The temporary save area 103d temporarily saves various data.

The data storage means 104 is a memory for storing sensed image data compressed by JPEG by the CPU 101, various kinds of additional information (e.g., image sensing time and the like) to be referred to by an application, and the like in a file format. In this embodiment, the data storage means 104 comprises a flash memory. Note that other storage media such as a floppy disk and the like may be used.

The camera module 105 comprises a lens unit, CCD (photoelectric conversion element), timing generator, A/D converter, image processing DSP, and the like, and performs operations such as image data transfer, AE, white balance adjustment, and the like in accordance with a signal from the CPU 101.

The tablet controller 109 makes drive control of the handwriting tablet 110 and control for converting various kinds of information input by pen touch into digital signals and transferring the information to the CPU 101 in accordance with a control signal from the CPU 101.

The LCD controller 106 processes YUV digital image data transferred from the camera module 105 or an image file in the data storage means 104. That is, the LCD controller 106 receives JPEG-decompressed YUV digital image data, converts it into an RGB digital signal, and outputs the RGB digital signal to the display driver 107. The display driver 107 controls to drive the display 108. The display 108 displays an image, and comprises a VGA compatible (640.times.480 dots) TFT liquid crystal display. However, the present invention is not limited to such specific display.

The shutter SW 113 is used to instruct to start an image sensing operation. The shutter SW 113 has two switch positions corresponding to the depression pressures of the switch. Upon detecting the first position (low depression pressure; to be referred to as a "half-stroke position" hereinafter), camera setups such as white balance, AE, and the like are locked. Upon detecting the second position (high depression pressure; to be referred to as a "shutter ON position" hereinafter), an image is captured in response to a capture signal.

Figure 2:
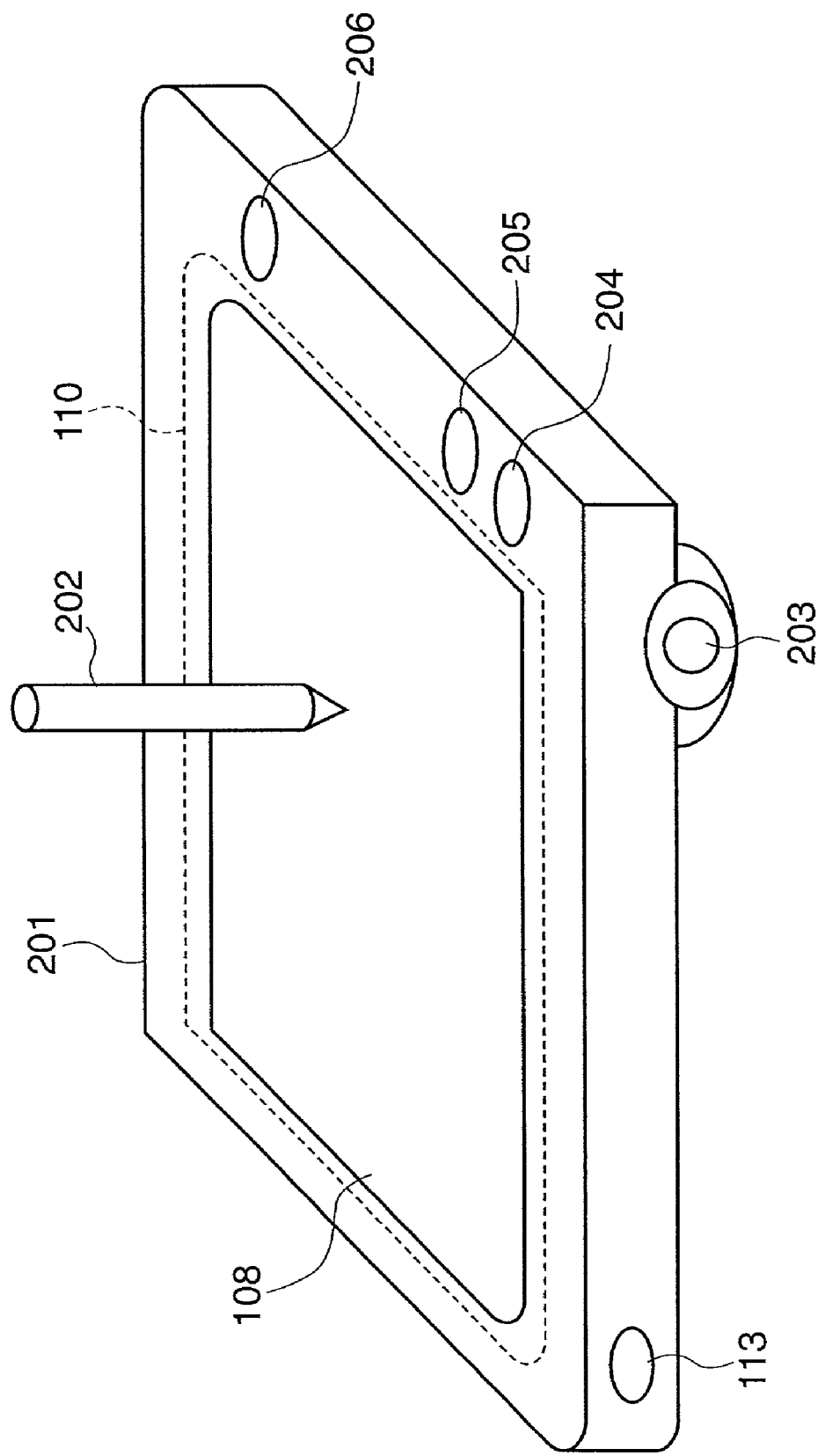
FIG. 2 is a perspective view showing the outer appearance of an image processing apparatus 201 in the first embodiment of the present invention.

FIG. 2 shows the outer appearance of an image processing apparatus 201 of this embodiment. The handwriting tablet 110 is set on the upper surface of the display (LCD) 108, and the operator gives an instruction to a GUI displayed on the display 108 to the CPU 110 via the handwriting tablet 110 using, e.g. a pen 202. The camera module 105 is set at a position 203 in FIG. 2, and the shutter switch 113 is also set on this side surface. The key SW group 114 used to instruct other operations is set at positions 204 to 206 in FIG. 2.

Figure 3:
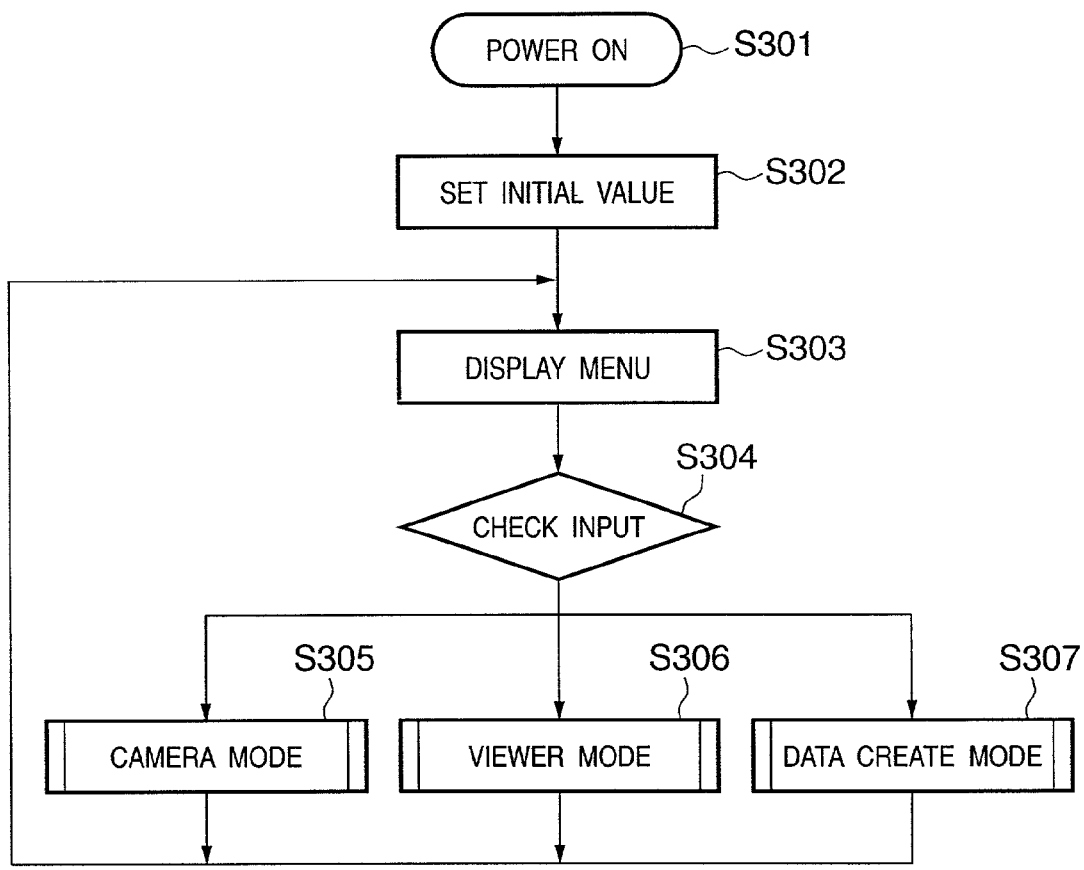
FIG. 3 is a flow chart of a main operation process of the image processing apparatus in the first embodiment of the present invention.

The operation of the image processing apparatus of this embodiment will be described below using the flow charts in FIGS. 3, 4A and 4B, and display examples in FIGS. 5 to 7. Note that program codes according to the flow charts of the processes done by the image processing apparatus of this embodiment shown in FIGS. 3, 4A and 4B are stored in the ROM 102, and are read out and executed by the CPU 101.

The main operation process of the image processing apparatus of this embodiment will be described first using the flow chart of FIG. 3.

Upon power ON, the flow advances from step S301 to step S302 to clear the contents of the RAM 103, set initial values in various flags used in an application or the like, turn on a backlight of the display 108, and so forth. In step S303, a menu for selecting various modes as an initial screen of the image processing apparatus of this embodiment is displayed on the display 108. In step S304, the control waits for a key input or an input to the handwriting tablet 110. Upon detecting an input, the flow branches to an application selected from the displayed menu. If a camera mode is selected, an application of the camera mode in step S305 is launched.

In the camera mode, a viewfinder is displayed on the display 108, and image data is captured from the camera module 105 and is stored in the data storage unit 104 upon receiving a capture signal from the shutter SW 113. At this time, date data is referred to from the RTC 115 and the image sensing time is saved together with image data.

If a data creation (edit) mode is selected, the flow advances to step S307. In the data edit mode, various data are appended to sensed image data as additional information. The additional information includes link information set for image data (to be described in the paragraph of a viewer mode), grouping information of link information, an index of that image data, and the like.

If the viewer mode is selected, the flow advances to step S306, and an application of the viewer mode for referring to data stored in the data storage means 104 is launched. The operation of the application of the viewer mode will be described below using the flow chart of FIGS. 4A and 4B.

Upon selecting the viewer mode, the flow advances from step S401 to step S402 to check if the display mode is a full-screen mode (for displaying an image on the entire screen of the display 108), or a list display mode. If the full-screen mode is selected, the flow advances to step S403; if the list display mode is selected, the flow advances to step S411. Since a default value sets the list display mode, a list display process is executed in step S411, as shown in FIG. 5.

Figure 5:
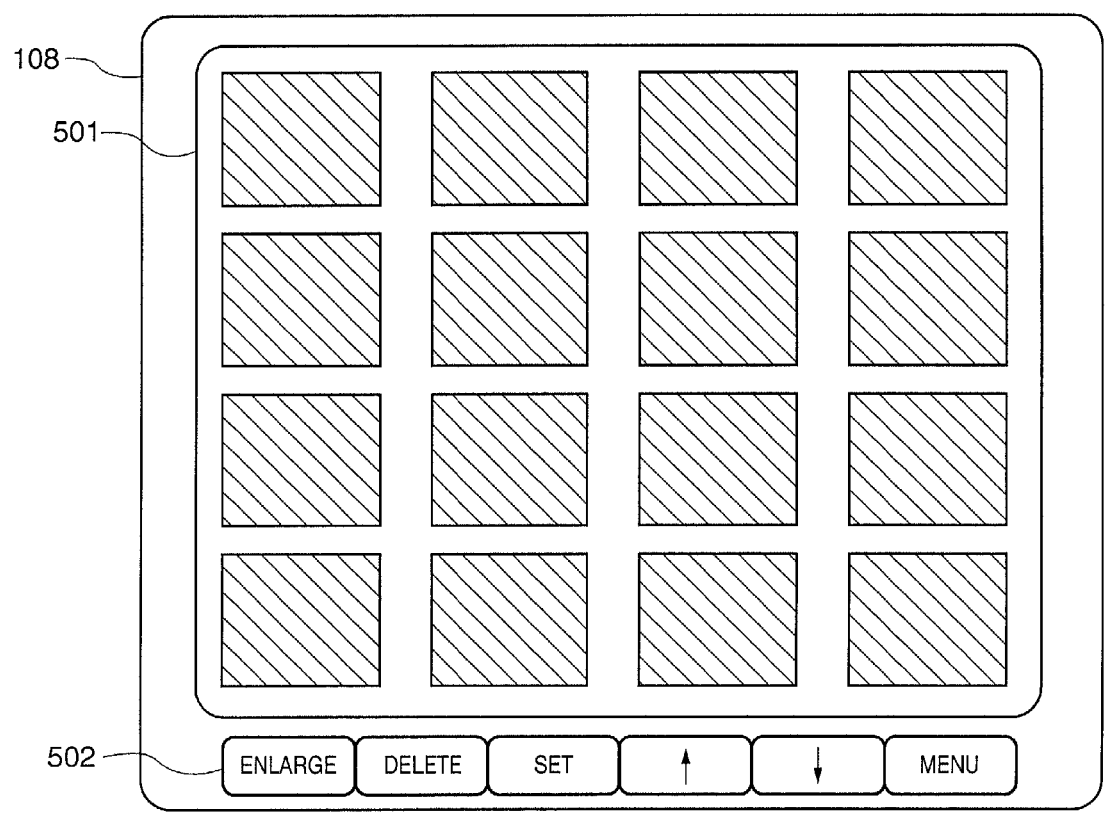
FIG. 5 shows a display example of a list display mode.
Figure 6:
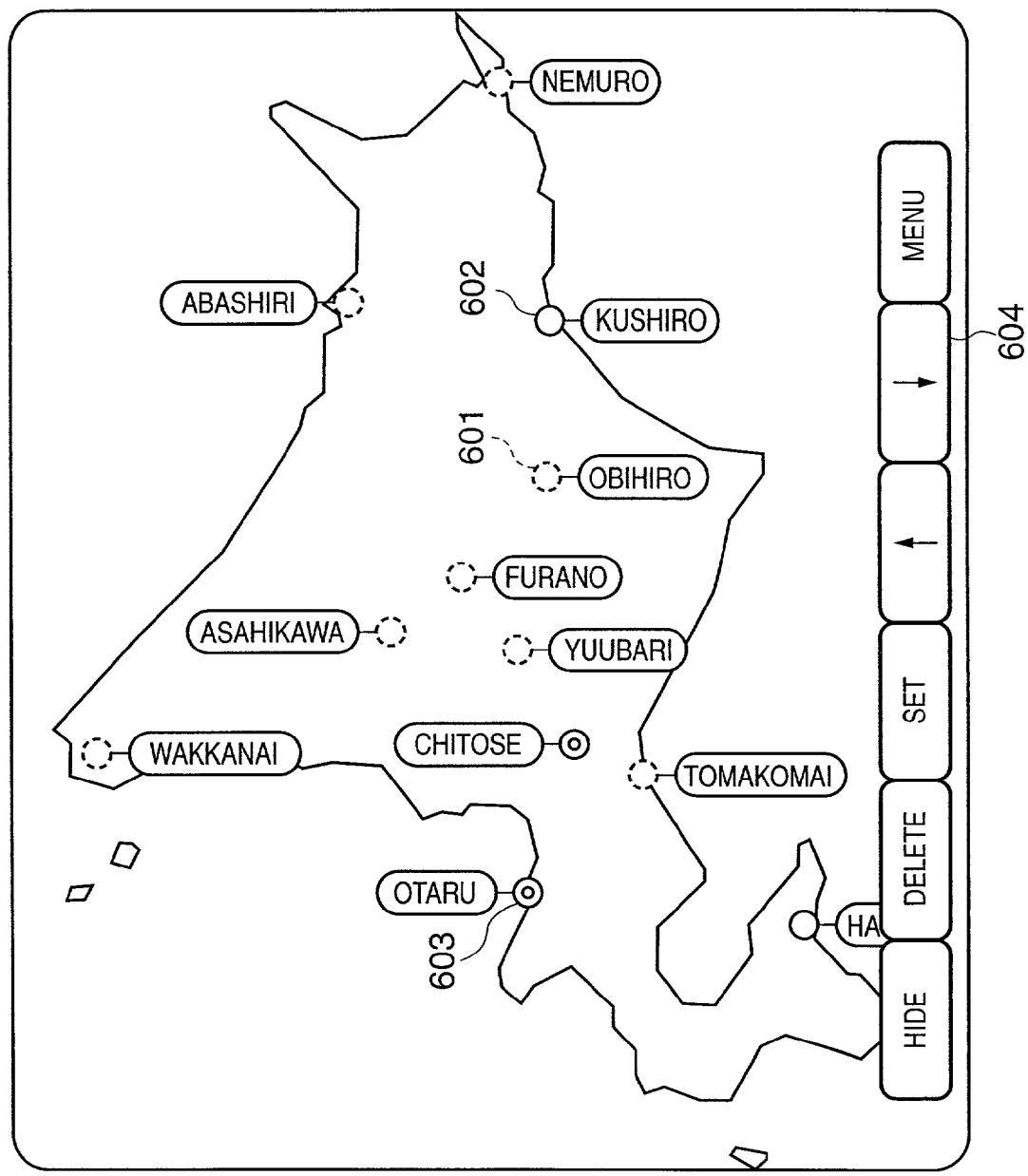
FIG. 6 shows an image display example in the first embodiment.

Referring to FIG. 5, thumbnails of image data stored in the data storage means 104 are displayed on hatched portions on a region 501. On a region 502, icons with which the operator instructs to display an image in an enlarged scale (full-screen display), to select the previous/net page, to return to menu display, and so forth, are displayed. In this embodiment, when the user designates a thumbnail with the pen 202, an image of the designated thumbnail can be displayed in the full-screen mode.

Referring back to FIGS. 4A and 4B, if an image to be displayed in the full-screen mode is selected in step S411, the full-screen mode is set as the display mode. The flow returns to step S402 and the selected image is displayed in the full-screen mode in step S403. At this time, operation icons 604 such as image select icons shown in FIG. 6 are displayed at the same time.

A check is made in step S404 as to whether additional information of the selected image contains link information. If no link information is found, the flow advances to step S412. If link information is found, the flow advances to step S405. Note that the link information is used to switch display to another image by designating a given region in the image using the pen 202 or the like. A region having link information in the image will also be referred to as a "link region".

A check is made in step S405 by referring to link information corresponding to the link region of interest as to whether that link region has two or more link destinations. If the link region does not have two or more link destinations, the flow advances to step S407 to display a dotted circle on that link region (601 or the like in FIG. 6). If the link region has two or more link destinations, a further check is made in step S406 as to whether that link region has three or more link destinations. If the link region has only two link destinations, a solid circle is displayed on that link region (602 or the like in FIG. 6) in step S409. If the link region has three or more link destinations, a double circle is displayed on that link region (603 or the like in FIG. 6) in step S408.

Upon completion of one of the processes in steps S407 to S409, the flow advances to step S410 to check the additional information so as to detect whether another link region is present. If such next link region is found, the flow returns to step S405 to repeat the aforementioned processes in steps S405 to S409 for the next link region. If all the link regions in the additional information of the selected image are already displayed, the flow advances from step S410 to S412.

In step S412, the control waits for operator's input to the handwriting table 110 after the image and link regions are displayed. If input is detected in step S412, a check is made in step S413 as to whether the input region is the operation icon region 604 or link region. If the input region corresponds to another region, the input is invalidated, and the flow returns to step S412. If the input region corresponds to a valid region, a check is made in step S414 as to whether the input region is the link region. If the input region is not the link region (it is the icon region 604), the flow advances to step S422 to execute a process corresponding to the designated operation icon 604. If it is determined in step S414 that the input region is the link region, a check is made in step S415 as to whether the designated link region has a plurality of link destinations. If the designated link region has only one link destination, an image at the link destination is set as display data in step S421. The flow then returns to step S402 to display an image at the link destination in the subsequent processes. On the other hand, if it is determined in step S415 that the designated link region has a plurality of link destinations, all the link destinations are displayed as a popup list (701 in FIG. 7) in step S416. At this time, text data set in indices of images in their additional information are displayed on the list.

In step S417, the control waits until the operator selects a link destination from the list. If an input is detected, the selected region is checked in step S418. If the selected region falls outside the list display region, it is determined that link display is canceled, and the flow returns to step S412 after the list is cleared. If it is determined in step S418 that the selected region falls within the list display region, the flow advances to step S419 to set an image at the selected link destination as display data. The flow then returns to step S402 to display an image at the link destination in the subsequent processes.

With the aforementioned operation, in the image processing apparatus and method of this embodiment, image data in which a plurality of link destinations are set in one link region can be processed. Since the link regions are displayed in different patterns depending on the number of link destinations set therein, the operator can intuitively recognize the setup states of links.

In this embodiment, when there are a plurality of link destinations, index information of image data at each link destination is displayed as a list. Alternatively, thumbnails of images at the link destinations may be displayed.

[Second Embodiment]

Figure 8B:
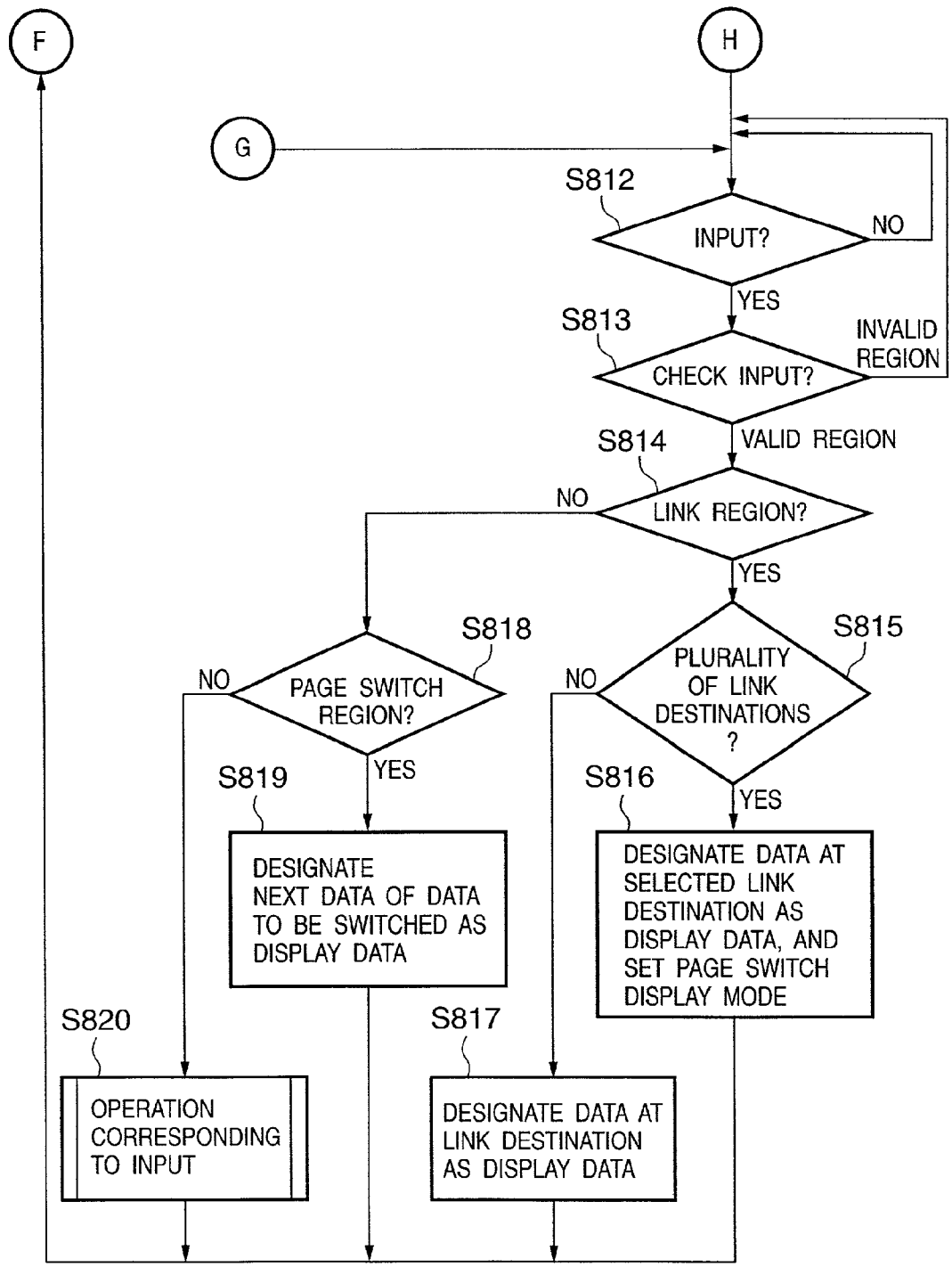

In this embodiment, the operation of the first embodiment executed when a plurality of link destinations are found upon designating a link region is modified, so that a plurality of link destinations can be displayed in turn by switching pages to be displayed. The operation executed when a plurality of link destinations are found upon designating a link region in the image processing apparatus of this embodiment will be described below using the flow chart in FIGS. 8A and 8B and display examples in FIGS. 9A, 9B, and 9C. Note that the schematic arrangement, outer appearance, and flow chart of the menu display process of the image processing apparatus of this embodiment are respectively shown in FIGS. 1, 2, and 3, and are the same as those in the first embodiment.

Upon selecting the viewer application, the flow advances from step S304 to S801, and the viewer application starts. Note that the processes in steps S801 to S813 are the same as those in steps S401 to S413 in the first embodiment. If it is determined in step S813 that the input region is a valid region, the flow advances to step S814 to check whether the input region is a link region. If the input region is a link region, the flow advances to step S815 to check if a plurality of link destinations are set. If one link destination is set, the flow advances to step S817 to set image data at the link destination as display data. The flow returns to step S802, and image data at the link destination is displayed in the full-screen mode in the subsequent processes. On the other hand, if it is determined in step S815 that a plurality of link destinations are set, all pieces of link information that pertain to images at all the link destinations are stored in the work area 103b of the RAM 103 in, e.g., alphabetical order (read out from the data storage means 104) in step S816. Then, the display mode of the screen is set in a page switch mode, and the flow returns to step S802. Upon displaying an image (step S803) in the subsequent processes, display is made in the page switch mode, as shown in FIG. 9B. Although not shown in FIGS. 8A and 8B, if the display mode is the page switch mode in step S802, the flow advances to step S803.

Figure 9C:
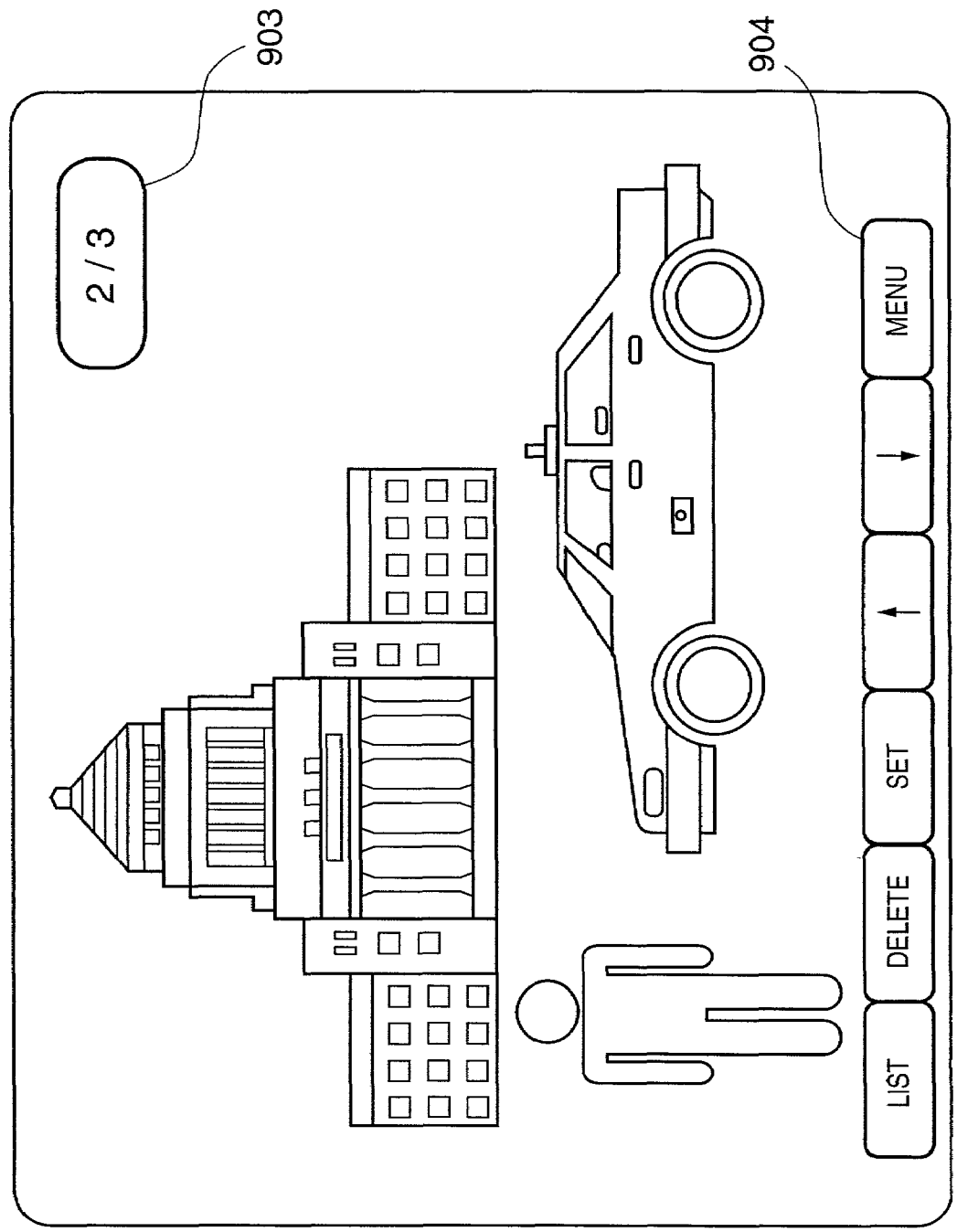
FIG. 9C shows an image display example in the second embodiment.

Referring to FIG. 9B, in the page switch mode, a region 902 used to switch a page is displayed on the basis of information of the link destinations stored in the work area 103b in step S816. The region 902 displays the total number of pages that can be switched, and the order of a currently displayed image. When the operator touches the page switch region 902 with the pen 202 or the like while that region is displayed, the flow advances to step S818 via the process in step S814. Since the page switch region is touched, the flow advances to step S819, and image data next to the currently displayed image data in the link destination information stored in the work area 103b is set as display data. The flow returns to step S802, and the set display data is displayed, as shown in FIG. 9C. If the touched region is not the page switch region, since an operation icon is designated, a corresponding process is executed in accordance with the function of that icon (step S820).

In the image processing apparatus of this embodiment, when a plurality of link destinations are set, these link destinations can be displayed in turn by switching pages.

[Third Embodiment]

This embodiment will explain an image processing apparatus and method that reproduce an image corresponding to each link region when a plurality of link regions are set for one image, and a plurality of pieces of information that link with these link regions are grouped, and are ordered in each group.

Figure 10:
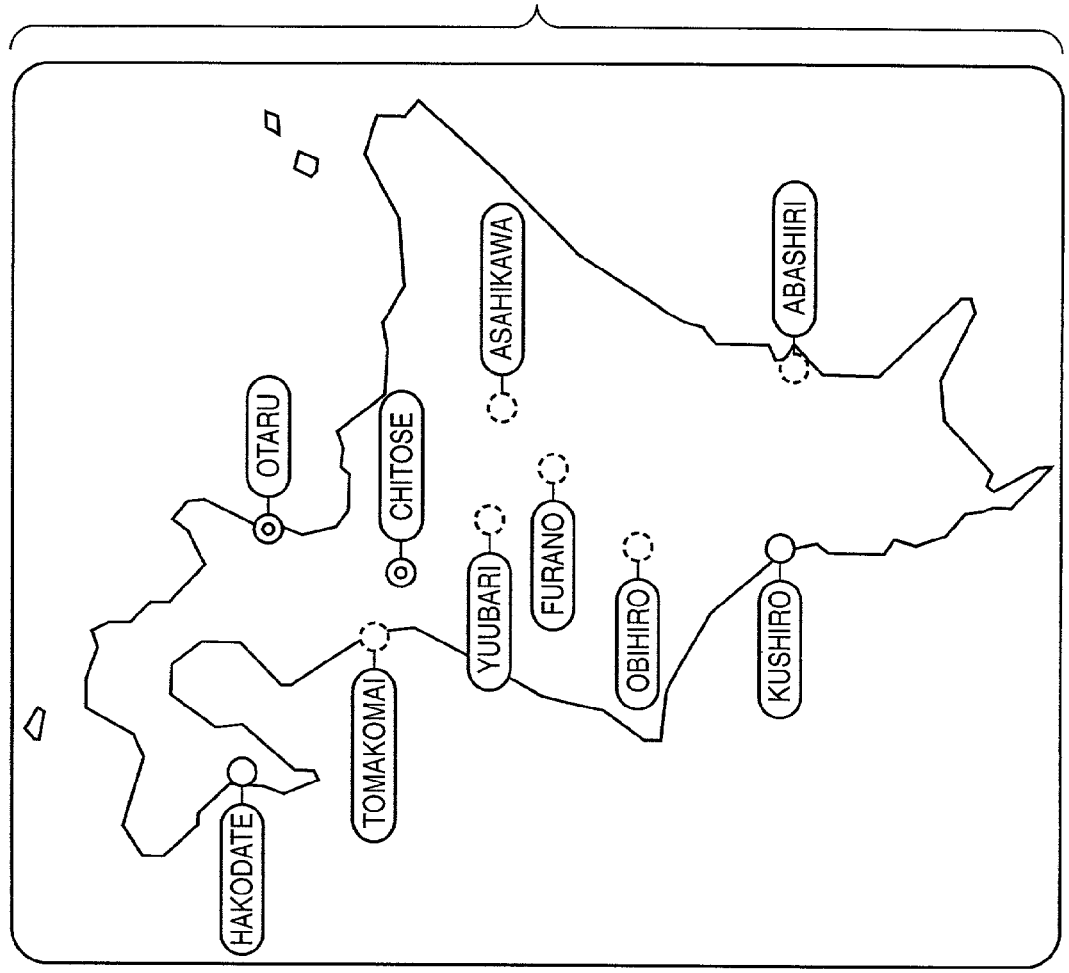
FIG. 10 shows an image display example when link information in the third embodiment has already been set in an image in each link region.

FIG. 10 shows a display example in which link information in this embodiment is already set for an image in each link region. Link information of routes (groups) I to III is appended to an image corresponding to each link region as additional information of image data. The routes I to III correspond to the aforementioned groups. One image links with each of I to III (place names in this embodiment) shown in FIG. 10. FIG. 15 shows the format of link information in the additional information of image data of this embodiment.

In FIG. 15, field 1 stores "Ser. No." for identifying image data, and field 2 stores the image sensing date and time of an image. Field 3 indicates link information of that image. When that image belongs to a pre-ordered specific group (corresponding to a route in this embodiment), "group No." for identifying that group, and the place in that group are stored. Furthermore, "Ser. Nos." of images in the previous and next places in the group are stored. If the image is contained in a plurality of groups, then several fields of the type of field 3 are present in correspondence with the number of groups which contain that image, and each of those fields stores "group No." of a group, the place in the group, and "serial Nos." of images in the previous and next places in the group.

Field 4 indicates link region information, and stores the coordinate values of link regions to be displayed on the image, the total number of images which link with these link regions together with link information, and "Ser. Nos." of these images. In this embodiment as well, since a plurality of images are linked with one link region together with a plurality of pieces of link information, the aforementioned information contents that pertain to linked images are appended to field 4 in correspondence with the number of linked images.

The operation of the image processing apparatus of this embodiment will be described below using the flow charts shown in FIGS. 11A, 11B and 12 and display examples shown in FIGS. 13A to 13C. Note that the schematic arrangement, outer appearance, and flow chart of the menu display process of the image processing apparatus of this embodiment are respectively shown in FIGS. 1, 2, and 3, and are the same as those in the first embodiment.

Figure 11B:
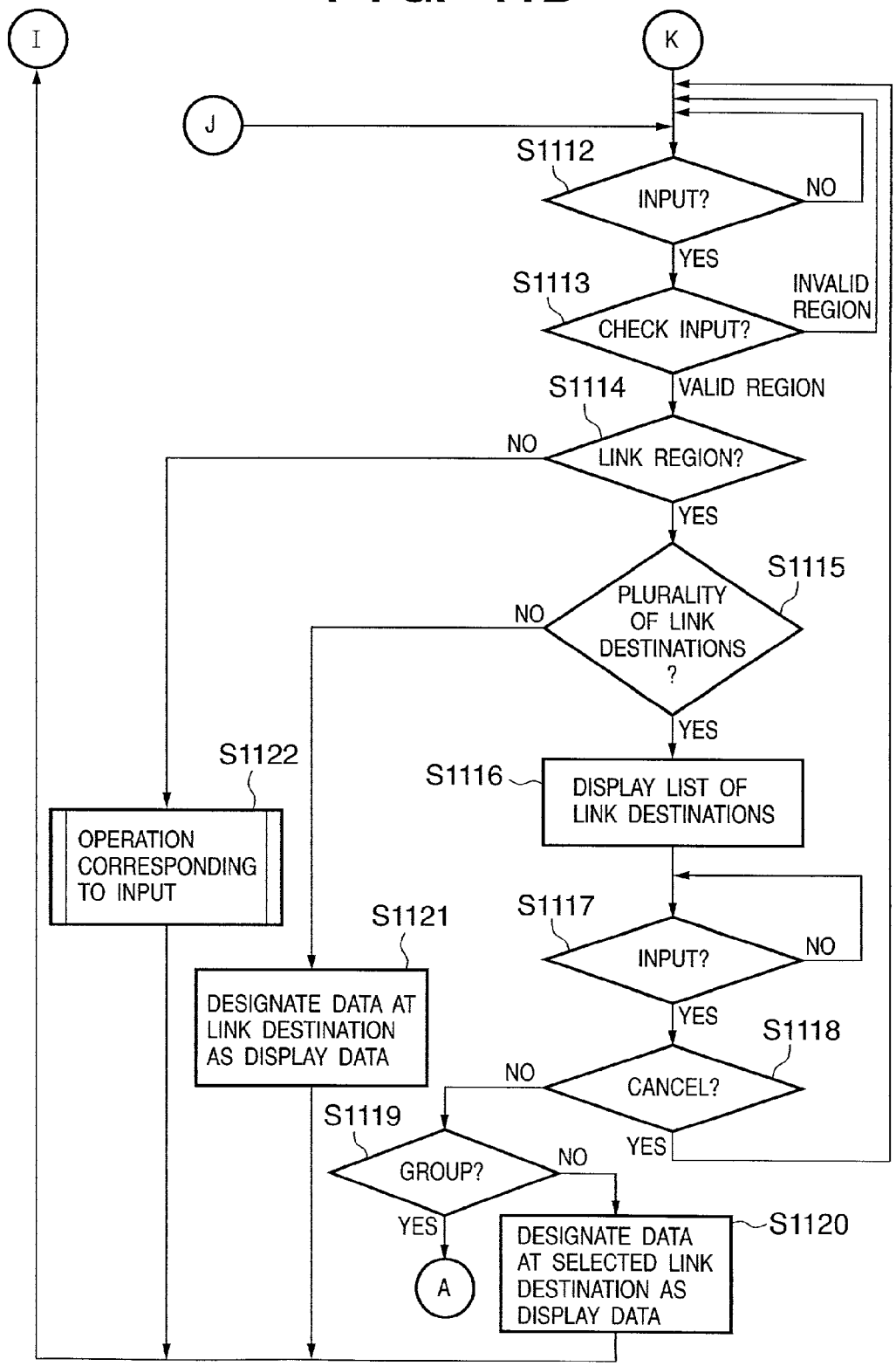

Upon selection of the viewer mode, the flow advances to step S1101 in FIGS. 11A and 11B. The processes in steps S1101 to S1115 are the same as those in steps S401 to S415 in the first embodiment. When the flow advances from step S1115 to step S1116, indices of image data corresponding to all link destinations are displayed as a popup list. At this time, an item for designating "group link display" for displaying an ordered group is added to the list.

In step S1117, the control waits until the operator selects from the list. If an input is detected, the selected region is checked in step S1118. If a region outside the list display region is selected, it is determined that link operation is canceled, and the flow returns to step S1112. If it is determined in step S1118 that a region within the list display region is selected, the flow advances to step S1119. If "group link display" is selected, the flow advances to step S1201 in the flow chart shown in FIG. 12. If it is determined in step S1119 that "group link display" is not selected, since one of image data displayed in the list is selected, image data at the selected link destination is designated as display data in step S1120, and the flow returns to step S1102. Then, the selected image data is displayed. Note that the processes in steps S1121 and S1122 are the same as those in steps S421 and S422 in the first embodiment.

Figure 12:
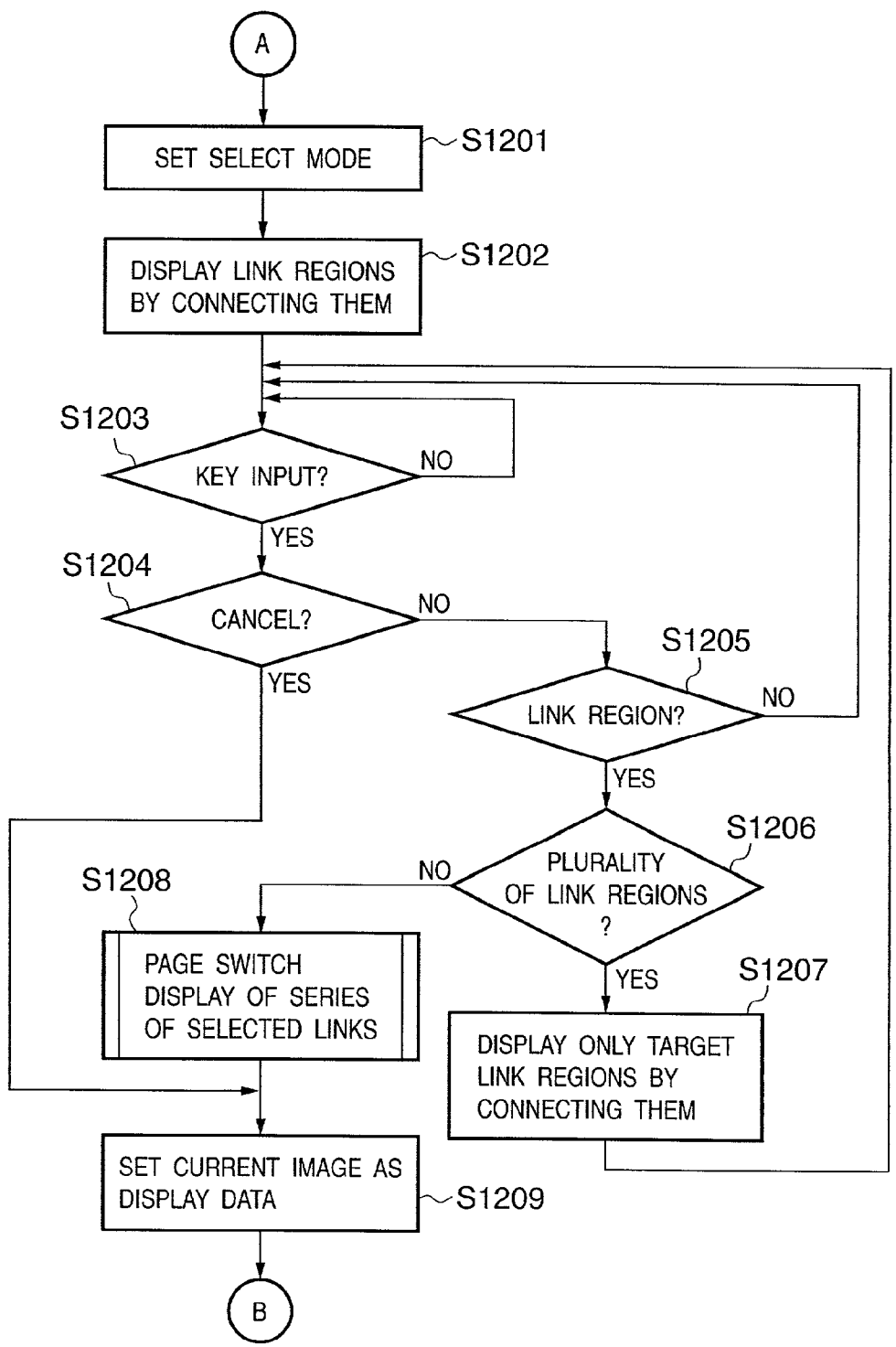
FIG. 12 is a flow chart of a process of the image processing apparatus in the third embodiment.

In FIG. 12, a "group link display" mode is set in step S1201, and only a group that starts from the designated link region is displayed by connecting the respective link regions via arrows in step S1202. At this time, link regions which do not belong to the selected group are cleared.

FIG. 13A shows a normal image display state, and FIG. 13B shows a display state upon selecting "group link display". In this example, "group link display" is selected in a link region 1301 in FIG. 13A. Hence, only a group that starts from the link region 1301 is displayed by connecting link regions via arrows. The designated link region is displayed in black (1301a). Note that link information which is the same as I to III in FIG. 10 is set for this image.

In step S1203, the control waits for the operator's input. If an input is detected, a check is made in step S1204 as to whether a link region is selected. If cancellation of operation is selected, the current image is set to be displayed normally in step S1209, and the flow returns to step S1102.

On the other hand, if it is determined in step S1204 that the operator's input is not to cancel operation, the flow advances from step S1204 to step S1205. If the operator's input selects a link region, the flow advances to step S1206. On the other hand, if the operator's input does not select any link region, the input is invalidated, and the flow returns to step S1203 to wait for the next input.

A check is made in step S1206 as to whether a plurality of images of the currently displayed group are linked with the link region designated by the input. If a plurality of images are linked, the flow advances to step S1207. Then, "group Nos." to which images linked with the input link region belong are compared with the currently displayed group, display of any group which does not include the "group No." to which images linked with the input link region belong is canceled, and the flow returns to step S1203 to wait for the next input.

In the display example shown in FIG. 13B, when the operator designates a region 1302 in FIG. 13B, a link region 1302a (see FIG. 13C) is painted in black, and only dotted lines (connection lines) with arrows, which connect cities included in groups I and II, are displayed, as shown in FIG. 13C. Then, a connection line (a dotted line with arrows between Chitose and Hakodate) of group III is cleared. Furthermore, when a link region 1303 is designated in the display example shown in FIG. 13C, since the link region 1303 is included only in group II, the flow advances from step S1206 to step S1208. Then, images of the selected group (II) are displayed in the order determined in the group in the page switch mode, as shown in FIGS. 9B and 9C in the second embodiment. Upon completion of page switch display, the current image is set to be displayed normally in step S1209, and the flow returns to step S1102.

In "group link display" of this embodiment, a specific group can be selected and displayed by selecting among a plurality of link regions.

[Fourth Embodiment]

Upon selecting a group in "group link display" of the third embodiment, groups that start from the initially designated link region are displayed by connecting link regions via arrows, and a link region that belongs to the displayed group is further selected to select and display a desired group.

In this embodiment, upon selecting a group in "group link display", only links to next link regions which branch from a group that starts from the initially designated link region are displayed, and a desired group is selected by repeating this operation.

FIGS. 14A, 14B, and 14C show display examples of this embodiment. In this embodiment as well, groups 1 to 3 are appended as additional information to images of respective link regions.

FIG. 14A shows a normal image display state. In this state, link regions set in additional information of the displayed image are displayed in addition to image data. When the operator designates a link region 1401 with the pen 202 or the like on the screen shown in FIG. 14A, groups that start from the region 1401 undergo "group link display", as shown in FIG. 14B. In this case, arrows that connect the designated link region and link regions in the next place in the groups which start from the region 1401 are displayed. Furthermore, when the operator designates a link region 1402 with the pen 202 or the like in FIG. 14B, display is switched to that shown in FIG. 14C. In FIG. 14C, the next link destinations of groups that branch from the link region 1402 are displayed by arrows. In this embodiment, arrows are displayed from the region 1402 to regions 1404 and 1403. Moreover, when the operator selects the link region 1403 or 1404, a group can be selected, and can undergo page switch display as in the third embodiment.

In the flow chart of this embodiment, the process in step S1202 in FIGS. 11A, 11B and 12 is replaced by a process for displaying arrows to link regions in the next place in groups that start from the designated link region. At this time, arrows to link regions other than those in the place next to the designated link region are cleared.

In "group link display" of the fourth embodiment, a specific group can be selected and displayed by selecting in turn link regions in accordance with displayed arrows.

[Another Embodiment]

Note that the present invention may be applied to either a system constituted by a plurality of devices (e.g., a host computer, an interface device, a reader, a printer, and the like), or an apparatus consisting of a single unit of equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, the storage medium stores program codes corresponding to the flow charts (shown in FIGS. 3, 4A and 4B, FIGS. 3 and 8, or FIGS. 3, 11A, 11B and 12) described previously, or the flow chart described in the fourth embodiment.

To restate, according to the present invention, image data in which a plurality of link destinations are set in one link region can be processed. Since the link regions are displayed in different patterns depending on the number of link destinations set therein, the operator can intuitively recognize the setup states of links.

The present invention is not limited to the above embodiments and various changes and modifications can be made within the spirit and scope of the present invention. Therefore to apprise the public of the scope of the present invention, the following claims are made.

What is claimed is:

1. An image processing apparatus for displaying an image, comprising:
   a storage unit for storing a first image having at least two link regions, wherein each link region has at least one link destination and at least one link region has at least two link destinations;
   a coordinates storage unit for storing coordinates where each link region is located on the first image;
   a counting unit for counting, for each link region, a number of link destinations;
   an image display unit for displaying the first image, with each link region displayed in a manner according to the number of link destinations for each link region respectively;
   a list display unit for, when a link region having at least two link destinations in the first image is designated by a predetermined pointing device, displaying a list representing at least two link destinations of the designated link region; and
   a second image display unit for displaying a second image corresponding to a link destination selected, by the predetermined pointing device, from the list.

2. The apparatus according to claim 1, wherein the list is displayed near the designated link region.

3. The apparatus according to claim 1, further comprising:
   a group display unit for displaying a group of ordered link regions; and
   a group selection unit for selecting the group to be displayed when a link region in the first image is designated by the predetermined pointing device.

4. The apparatus according to claim 3, further comprising a display unit for displaying link destination of each link region in the first image in accordance with the order of the selected group.

5. The apparatus according to claim 3, wherein link regions in the group are displayed by connecting arrows in accordance with the order.

6. The apparatus according to claim 3, wherein link regions in the next place in the group are displayed by connecting arrows.

7. An image processing method for displaying an image, comprising:
- a storing step of storing a first image having at least two link regions,
- wherein each link region has at least one link destination and at least one link region has at least two link destinations;
- a coordinates storage step of storing coordinates where each link region is located on the first image;
- a counting step of counting, for each link region, a number of link destinations;
- an image displaying step of displaying the first image, with each link region displayed in a manner according to the number of link destinations for each link region, respectively; and
- a list displaying step of, when a link region having at least two link destinations in the first image is designated by a predetermined pointing device, displaying a list representing at least two link destinations of the designated link region; and a second image display step, of displaying a second image corresponding to a link destination selected, by the predetermined pointing device, from, the list.

8. The method according to claim 7, further comprising:
- a group unit displaying step of displaying a group of ordered link regions; and
- a group unit selecting step of selecting the group to be displayed when a link region in the first image is designated by the predetermined pointing device.

9. A computer executable image processing program, stored in a computer-readable storage medium, for displaying an image, including a program code which implements:
- a storing step of storing a first image having at least two link regions, wherein each link region has at least one link destination and at least one link region has at least two link destinations;
- a coordinates storage step of storing coordinates where each link region is located on the first image;
- a counting step of counting, for each link region, a number of link destinations;
- an image displaying step of displaying the first image, with each link region displayed in a manner according to the number of link destinations for each link region, respectively; and a list displaying step of, when a link region having at least two link destinations in the first image is designated by a predetermined pointing device, displaying a list representing at least two link destinations of the designated link region; and
- a second image display step, of displaying a second image corresponding to a link destination selected, by the predetermined pointing device, from the list.

10. The program according to claim 9, further comprising:
- a group unit displaying step of displaying a group of ordered link regions; and
- a group unit selecting step of selecting the group to be displayed when a link region in the first image is designated by the predetermined pointing device.

11. The apparatus according to claim 1, wherein said image display unit displays each link region by one of a dotted circle, a solid circle, and a double circle in accordance with the number of link destinations of that link region.

* * * * *

UNITED STATES PATENT AND TRADEMARK OFFICE
CERTIFICATE OF CORRECTION

PATENT NO. : 7,284,206 B2
APPLICATION NO. : 09/861521
DATED : October 16, 2007
INVENTOR(S) : Mamoru Ozawa et al.

It is certified that error appears in the above-identified patent and that said Letters Patent is hereby corrected as shown below:

COLUMN 1

Line 57, "figures" should read --figures.--.

COLUMN 3

Line 58, "(640.times.480 dots)" should read --(640 x 480 dots)--.

COLUMN 6

Line 29, "chart" should read --charts--; and
    Line 37, "to" should read --to step--.

COLUMN 10

Line 62, "link destination" should read --link destination(s)--.

COLUMN 11

Line 18, "and" should be deleted; and
    Line 23, "and" should read --and ¶--.

COLUMN 12

Line 13, "respectively; and" should read --respectively; ¶--.

Signed and Sealed this

Seventeenth Day of June, 2008

JON W. DUDAS
*Director of the United States Patent and Trademark Office*